(12) United States Patent
Sundar et al.

(10) Patent No.: US 7,200,112 B2
(45) Date of Patent: Apr. 3, 2007

(54) METHOD, SYSTEM, AND APPARATUS FOR A MOBILE STATION TO SENSE AND SELECT A WIRELESS LOCAL AREA NETWORK (WLAN) OR A WIDE AREA MOBILE WIRELESS NETWORK (WWAN)

(75) Inventors: Rangamani Sundar, Windham, NH (US); Murali Aravamudan, Windham, NH (US); Shamim A. Naqvi, Morristown, NJ (US); Prakash R. Iyer, North Andover, MA (US); Kumar K. Vishwanathan, Windham, NH (US); Gurudutt Upendra Pai, North Andover, MA (US)

(73) Assignee: Winphoria Networks, Inc., Tewksbury, MA (US)

( * ) Notice: Subject to any disclaimer, the term of this patent is extended or adjusted under 35 U.S.C. 154(b) by 935 days.

(21) Appl. No.: 10/052,081

(22) Filed: Jan. 17, 2002

(65) Prior Publication Data

US 2003/0134636 A1 Jul. 17, 2003

Related U.S. Application Data

(60) Provisional application No. 60/345,800, filed on Jan. 2, 2002.

(51) Int. Cl.
*H04J 1/16* (2006.01)
*H04J 3/14* (2006.01)
(52) U.S. Cl. ............. 370/230; 370/328; 370/338; 455/426.1; 379/90.01; 726/13
(58) Field of Classification Search ................ 370/230, 370/328, 338; 455/426.1; 379/90.02; 726/13
See application file for complete search history.

(56) References Cited

U.S. PATENT DOCUMENTS 6,901,429 B2 * 5/2005 Dowling ................ 709/203

(Continued)

OTHER PUBLICATIONS

Recommended Practice for Multi-Vendor Access Point Interoperatbility via Inter-Access Point Protocol Across Distribution Systems Supporting IEEE 802.11 Operation (Draft), IEEE, Mar. 14, 2001, (Copyright 2001), pp. 1-23.

(Continued)

*Primary Examiner*—John Pezzlo
*Assistant Examiner*—Inder Pal Mehra

(57) ABSTRACT

A method, system and apparatus for internetworking WWAN and WLAN are disclosed. More specifically, a method, system, and apparatus for a mobile station to sense and select a WLAN or a WWAN are disclosed. A mobile station may communicate according to an 802.xx wireless local area network air interface protocol via WLAN logic or according to a wireless wide area network air interface protocol via WWAN logic. The mobile station detects RF energy in the 802.xx spectrum and, in response to the energy detection, determines whether there is an 802.xx WLAN capable of servicing the mobile station by performing a scanning operation. If there is an 802.xx WLAN capable of servicing the mobile station, the mobile station selects the WLAN logic so that it may communicate via an air interface. Under some embodiments, WWAN has information identifying the areas in which capable WLANs operate and the WWAN provisions the mobile station with at least a subset of such information. The mobile station uses such area-identifying information to determine whether to perform the RF energy detection operation. The information may be cell ids, or GPS information.

15 Claims, 32 Drawing Sheets

U.S. PATENT DOCUMENTS

| | | | |
|---|---|---|---|
| 2002/0085516 A1* | 7/2002 | Bridgelall | 370/329 |
| 2003/0043773 A1* | 3/2003 | Chang | 370/338 |
| 2005/0013275 A1* | 1/2005 | Black et al. | 370/329 |

OTHER PUBLICATIONS

"Part 11: Wireless LAN Medium Access Control (MAC) and Physical Layer (PHY) Specifications: Higher-Speed Physical Layer Extension in the 2.4 GHz Band", IEEE, Jan. 20, 2000, pp. 1-89.

Veeraraghavan, Malathi et al., "Support of Voice Services in IEEE 802.11 Wireless LANs", Polytechnic University, (mv@poly.edu, ncocke01@utopia, poly.edu, morrs@ieee.org).

"Symbol's Spectrum 24® High Rate Wireless LAN: IEEE 802.11b Ethernet-Speed Connectivity for Wireless Mobile and Portable Computing", Symbol Business Partners (www.symbol.com), Jan. 23, 2002.

Schwartz, Ephraim, editor, InfoWorld, "Wireless World", Jan 23, 2002.

* cited by examiner

METHOD, SYSTEM, AND APPARATUS FOR A MOBILE STATION TO SENSE AND SELECT A WIRELESS LOCAL AREA NETWORK (WLAN) OR A WIDE AREA MOBILE WIRELESS NETWORK (WWAN)

CROSS REFERENCE TO RELATED APPLICATIONS

This application claims priority to provisional application Ser. No. 60/345,800, entitled "Method for Voice Internetworking Between Local Area and Wide Area Mobile Wireless Networks," filed on Jan. 2, 2002.

BACKGROUND OF THE INVENTION

1. Field of the Invention

This invention relates to internetworking between wireless local area networks (WLANs) and wide area mobile wireless networks.

2. Discussion of Related Art

Subscribers are adopting wireless telephony in increasingly large numbers. This trend is being fueled further by attractive rate plans that are bringing the cost of telephony to acceptable levels for people in most walks of society. It is more common for people to rely almost exclusively on a mobile telephone for their telephony needs. In an office or enterprise environment, however, mobile telephony has not surpassed wireline enterprise telephony for a number of reasons, salient amongst which are the following:

The weakness of R/F signals from the wide area network infrastructure within an office building, leading to problems in mobility management and voice quality.
  The availability of special PBX features in office telephony systems, such as abbreviated dialing, offer a strong incentive for the continued use of enterprise telephony solutions.

The situation at the present is that people employ two distinct telephony systems, one in the wireless wide area network, and another in the enterprise premises that is a wireline telephony system, leading to a plurality of handsets, voice mailboxes and addressing mechanisms.

Parallel to these developments, wireless local area networks are becoming increasingly popular for wireless data applications. In such networks, reasonable bandwidth is available to enterprise-wide wireless clients, e.g., in 802.11b WLAN networks up to 11 Mbps are available to a wireless client. This bandwidth is more than sufficient to carry voice as well. Moreover, widespread use of WLAN technology is driving down the price of the technology.

FIG. 1 shows an exemplary wireless wide area network (WWAN) 100 (also known as a wide area mobile wireless network). WWAN 100 includes a plurality of remote units (handsets) 102 in radio contact with one or more antennae based systems called Base Transceiver System (BTS) 104 that transceive the radio signals to/from the handsets. A plurality of BTS communicate with a controller called the Base Station Controller (BSC) 106 via fixed links 108 using a variety of protocols and techniques, such as TDM, IP etc. A plurality of BSC communicate with a switch called the mobile switching center (MSC) 110 that provides connectivity to a wide area switched telephone network (WSTN) 111. The WSTN includes signaling links 113, such as SS7 links, and the public switched telephone network (PSTN) 112. As illustrated by MSC 115, an MSC may include a control plane 117 for handling messages on the signaling links, which may be communicated according to a variety of protocols, such as IOS, GSM A interface, IS 41, GSM MAP, etc. The MSC 115 may also include a media gateway 119 that cooperates with the control plane for handling the bearer circuits of the PSTN 112. Some modem MSCs, such as MSC 115, may also communicate on IP networks, such as IP network 120.

An MSC with its associated BSC and BTS collectively define a coverage area in which handsets are allowed to receive or transmit telephone calls. Incoming calls to a mobile handset arrive from the PSTN to a gateway MSC, e.g., 115, that then routes the call to the MSC 110, called a serving MSC, within whose coverage area the receiving handset is currently roaming. Outgoing calls from a handset are routed to the serving MSC 109 of the originating handset from where the call is either routed to the serving MSC of the receiving mobile handset via the gateway MSC or to the WSTN via the gateway MSC from where the WSTN routes the call to a (wireline) handset.

In some arrangements, the gateway and serving MSC functions may be implemented by the same physical entities. Subscribers are allowed to roam in the coverage area and while roaming the various entities of the WWAN cooperate to ensure that the wireless connectivity of the handset is preserved under roaming. A handset may roam from the coverage area of one set of BTS/BSC/MSC to the coverage area of another set of BTS/BSC/MSC. The former set of BTS/BSC/MSC is called the source and the latter set is called the target entities. A set of procedures has been defined that mediate the handoff of the handset from the source to the target entities of the WWAN. As a consequence of the handoff procedures, an update of the location of the handset may occur. This is accomplished by the handset sending a location update message to an MSC that routes the message to a registry called the Home Location Register (HLR) 114 using standard industry protocols such as IS-41, GSM-MAP, etc.

Various air interface technologies are used for the communication between handsets 102 and BTS 104. These technologies include code division multiple access (CDMA), global system for mobile communications (GSM), Personal Digital cellular (PDC), etc., and various extensions and enhancements of these technologies such as CDMA2000, universal mobile terrestrial system (UMTS), international mobile telephone IMT-2000, etc. All such networks employ the above referenced entities in well known, albeit using different nomenclature, configurations to transceive telephone calls. All this is well known to practitioners with ordinary skill in the art.

FIG. 2 illustrates an exemplary wireless local area network (WLAN) 200. WLAN includes one or more geographical areas (cells) calld basic service set (BSS) 202. A cell is controlled by a system called an access point (AP) 204. Typically, a WLAN includes several BSS, each with its associated AP. The AP are interconnected usually with a wireline network 206 typically using Ethernet in 802.xx WLAN technologies. The AP communicate with an enterprise router 208 that typically mutes traffic within and out of an enterprise network. Wireless data clients 210 are allowed to roam within a defined BSS and aqross the defined BSS, with handoff of the client from one AP to the adjoining AP in accordance to known procedures, In typical WLAN implementations, the physical layer uses variety of technologies, e.g., in 802.1 I WLAN implementations, the physical layer may use infrared, frequency hopping spread spectrum in the 2.4 GHz Band, or direct sequence spread spectwm in the 2.4 GHz Band. The medium access layer (MAC) in addition to carrying out typical functions performs additional functions such as packet fragmentation, re-transmission and acknowledgements.

The MAC layer supports two basic access mechanisms: the distributed coordination function (DCF) and the point coordination function (PCF). In DCF the basic access mechanism is a carrier sense multiple access with collision avoidance (CSMA/CA) mechanism. A typical example is Ethernet that is a CSMA with collision detection (CD) mechanism. In CSMA protocols a client wishing to transmit senses the medium, and if the medium is found to be busy, i.e., is being used by some other client, defers the transmission; otherwise it is allowed to transmit. There is always a possibility that two clients will sense the medium to be free and start transmissions thus resulting in collisions; therefore, collision avoidance and detection is very important in such protocols. For example, the 802.11 WLAN uses collision avoidance and detection mechanisms. An 802.11 client wishing to transmit senses the medium and if found busy defers the transmission; otherwise, it transmits. The receiver checks the receipt of a proper transmission (via the cyclical redundancy check—CRC) and if found satisfactory, sends back an acknowledgement. Receipt of the acknowledgement will indicate to the transmitter that the transmission was received properly. If no acknowledgement is received, the transmitter will retransmit until an acknowledgement is received or the transmitter decides to abort the transmission. In order to further reduce the possibility of collisions certain implementations also use the virtual carrier sense mechanism. In this scheme, a client wishing to transmit, first signals its intent by sending a request to send (RTS) to the intended receiver. The receiver responds with a clear to send (CTS) that effectively "reserves" the medium for the transmitter and receiver. The transmitter may now transmit the intended information.

In those cases when a client wishing to transmit finds the medium busy, the client defers the transmission. The client is thus obliged to re-try to find the status of the medium. In standard approaches to this problem, an "exponential back off procedure" is used to determine the frequency of re-trials. The method involves the choice of a random number and awaiting that many time slots before a re-trial. If a re-try finds the medium busy again, the re-trial number is reduced exponentially. This back off procedure is also used after a successful transmission and after each re-transmission.

When a client wishes to access a BSS (either after a power up or when first entering the BSS) it needs to get synchronization information from the AP controlling the BSS. Two methods have been defined for clients to get this information. In the passive scanning method the client waits to receive a "beacon frame" from the AP that is transmitted by the AP at regular intervals. The beacon frame contains the synchronization information. In the second method, called active scanning, the client sends a probe to the AP and awaits a response to the probe. Once the station finds an AP, it needs to be authenticated. This requires exchange of information between the AP and the client to establish the authenticity of the client. Once the authentication process is completed, the client starts the association process that involves exchange of information between the client and the APs about the location of the client and the capabilities of the BSS. At the completion of the association process, the client is ready for receiving or transmitting data.

In the PCF access mechanism, the AP gains control of the medium upon sensing it to be free for a given length of time called the point inter frame space (PIFS). The AP then assumes the role of the coordinator and starts to poll all stations enumerated on a "poll list" maintained by the AP. When polled, a station is allowed to transmit. The period in which the AP supports PCF mode is contention-free so may provide better opportunities for voice traffic. The AP must alternate the DCF and PCF periods. All this is well known to practitioners with ordinary skill in the art.

Therefore, what is needed is a method for internetworking of WLAN and Wireless Wide Area Networks (WWAN) for voice communications with full mobility management across the two networks and the preservation of PBX features in the WWAN environment.

SUMMARY

The invention provides a method, system, and apparatus for a Mobile Station to Sense and Select a Wireless Local Area Network (WLAN) or a Wide Area Mobile Wireless Network (WWAN). Among other things, this facilitates the internetworking of WLANs and WWANs and facilitates the use of multimode mobile stations that can selectively communicate with either a WLAN or a WWAN.

According to one aspect of the invention, a mobile station may communicate according to an 802.xx wireless local area network air interface protocol via WLAN logic or according to a wireless wide area network air interface protocol via WWAN logic. The mobile station detects RF energy in the 802.xx spectrum and, in response to the energy detection, determines whether there is an 802.xx WLAN capable of servicing the mobile station by performing a scanning operation. If there is an 802.xx WLAN capable of servicing the mobile station, the mobile station selects the WLAN logic so that it may communicate via an air interface.

According to another aspect of the invention, the WWAN has information identifying the areas in which capable WLANs operate and the WWAN provisions the mobile station with at least a subset of such information. The mobile station uses such area-identifying information to determine whether to perform the RF energy detection operation.

According to another aspect of the invention, the area-identifying information is cell ids and the mobile station compares the cell id information in which it is operating with the provisioned cell ids.

According to another aspect of the invention, the area-identifying information is geographical positioning satellite (GPS) information and the mobile station determines its GPS coordinates and compares it against the provisioned GPS information.

According to another aspect of the invention, the mobile station compares the RF energy value with a threshold value and the mobile station detects the RF energy of the WWAN and compares said RF energy of the WWAN with a predetermined value. The comparisons of the RF energy values with corresponding thresholds are used by the mobile station to select whether to communicate with the 802.xx WLAN and the WWAN.

According to another aspect of the invention, the area-identifying information includes information identifying WLANs other than that used by a service plan of the mobile station.

According to another aspect of the invention, the information identifying WLANs includes information identifying WLANs of enterprises accepting service of the mobile station.

According to another aspect of the invention, the mobile station is provisioned with the area information via SMS messages from the WWAN.

BRIEF DESCRIPTION OF THE DRAWING

In the Drawing,

FIGS. 13-4 show specific mobility management logic according to certain embodiments of the invention;

FIGS. 17-8 show specific mobility management logic according to certain embodiments of the invention;

FIGS. 20-1 show specific mobility management logic according to certain embodiments of the invention;

FIGS. 24-5 show logic for handling intra enterprise calls according to certain embodiments of the invention;

FIGS. 26-7 show logic for handling an enterprise to PSTN call according to certain embodiments of the invention;

DETAILED DESCRIPTION

Preferred embodiments of the invention provide voice internetworking between WLANs and WWANs and effectively unify these two disparate technologies. Consequently, users no longer need to suffer the problems associated with multiple handsets, addresses, and voice mailboxes. As will be explained below, under certain embodiments a gateway MSC (GMSC) switch of the WWAN with some associated modifications to the WLAN client provides the logic necessary for unification. In essence the GMSC simultaneously acts as a serving MSC for WLAN voice traffic.

Figure 1:
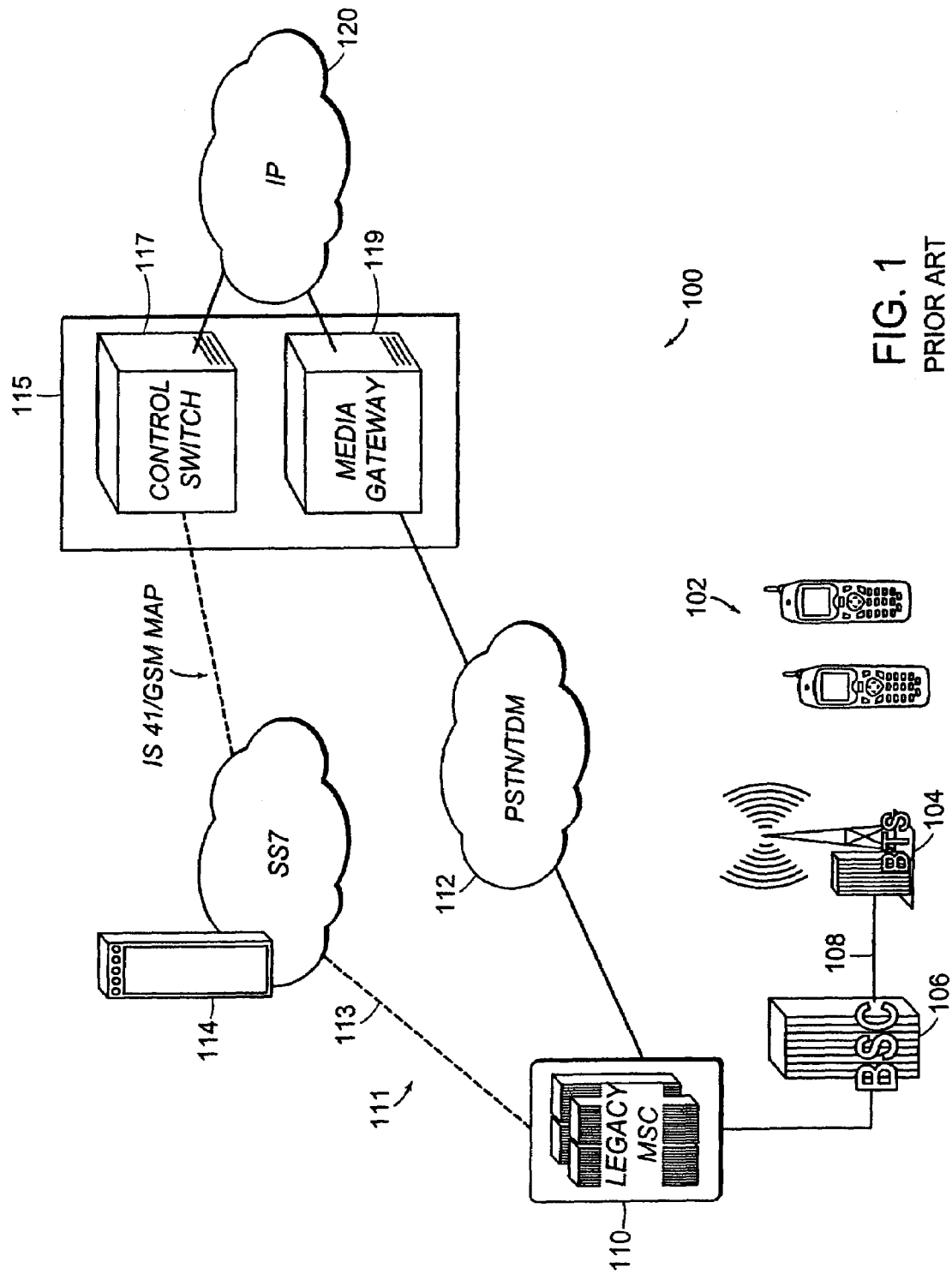
FIG. 1 shows a prior art wireless wide area network (WWAN)
Figure 2:
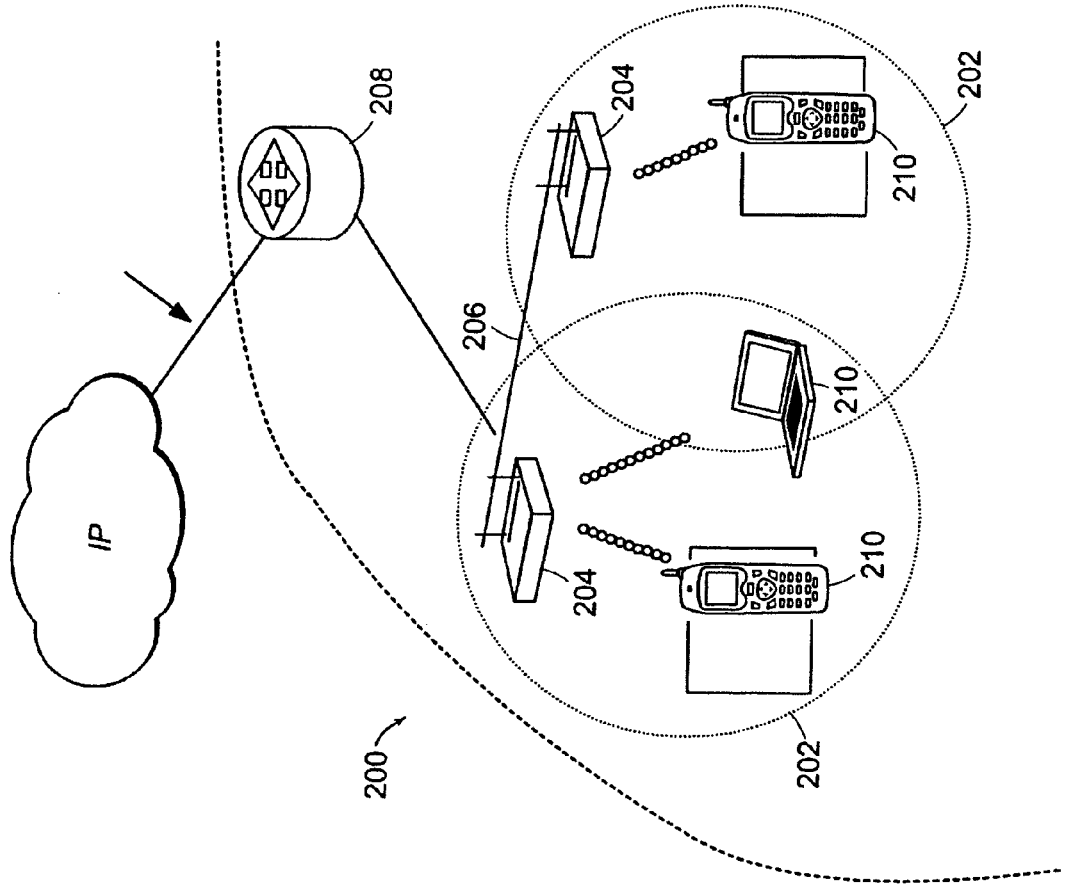
FIG. 2 shows a prior art wireless local area network (WLAN)
Figure 3:
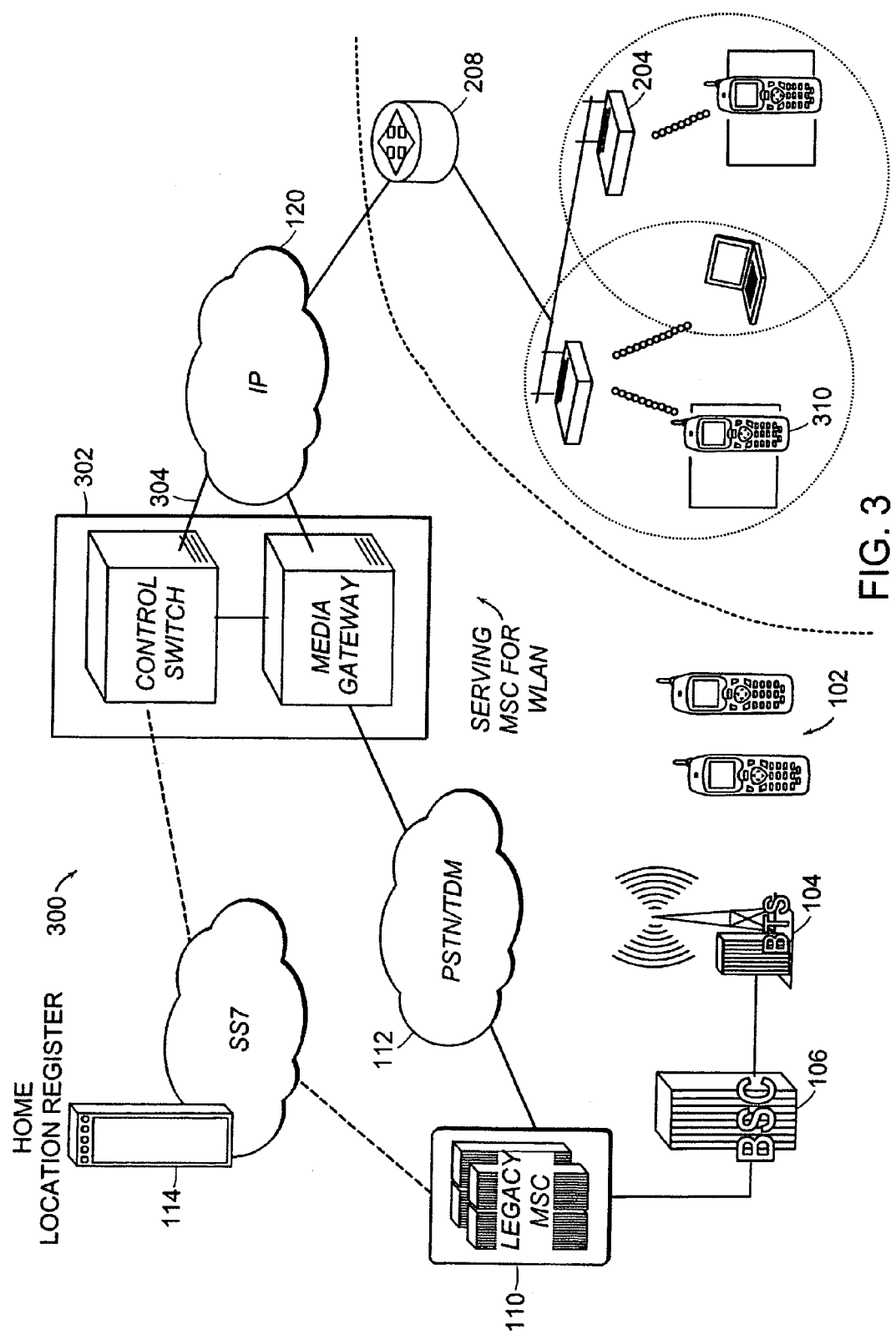
FIG. 3 shows an internetworked wireless network according to certain embodiments of the invention.

FIG. 3 illustrates an exemplary embodiment of the present invention. The WWAN components are like those described above in conjunction with FIG. 1 except that MSC 302 includes some new internetworking logic discussed below to handle the unification of the WLAN and WWAN to make it act as one macro network 300. Among other things, the MSC 302 acts as a serving MSC for the WLAN. The WLAN and WWAN are now effectively connected by the IP links 304. Voice traffic along with the associated signaling and control messages to and from the WLAN are carried on the set of IP links 304 from the enterprise to the IP interfaces of the MSC 302. The WLAN components are also like those described above, except that the handsets or wireless data clients 310 now include multimode devices capable of operating in the WLAN or WWAN environments, as will be explained below.

The MSC 302 allows telephone calls to be completed between clients of the WWAN 100 and WLAN 200. The WLAN clients are free to roam in the WLAN environment and may also roam in the WWAN environment without any manual interventions required of the subscriber. The voice traffic from the WLAN to the MSC 302 may utilize any of the known voice coding technologies. For CDMA networks the Enhanced Variable Rate Codec (EVRC) may be used and for GSM networks Adaptive Multi-rate (AMR) coding could be used. The coded voice is then carried as RTP/UDP/IP packets on the IP links 304. The control and signaling information is also carried on the IP links 304 from the WLAN 200 to the MSC 302. In certain embodiments the control and signaling information is carried in the format of Session Initiation Protocol (SIP) messages with additional information elements (IEs) described as a part of the present invention for control of hand offs of the handsets.

Voice internetworking in certain embodiments is facilitated by the use of a multimode handset 310 that may operate in a WLAN or WWAN environment. The WLAN and WWAN (multimode) phone 310 at any time should be able to automatically determine if it is capable of using WLAN access instead of a macro network carrier (GSM, CDMA, UMTS, TDMA, PDC, etc.).

Figure 4:
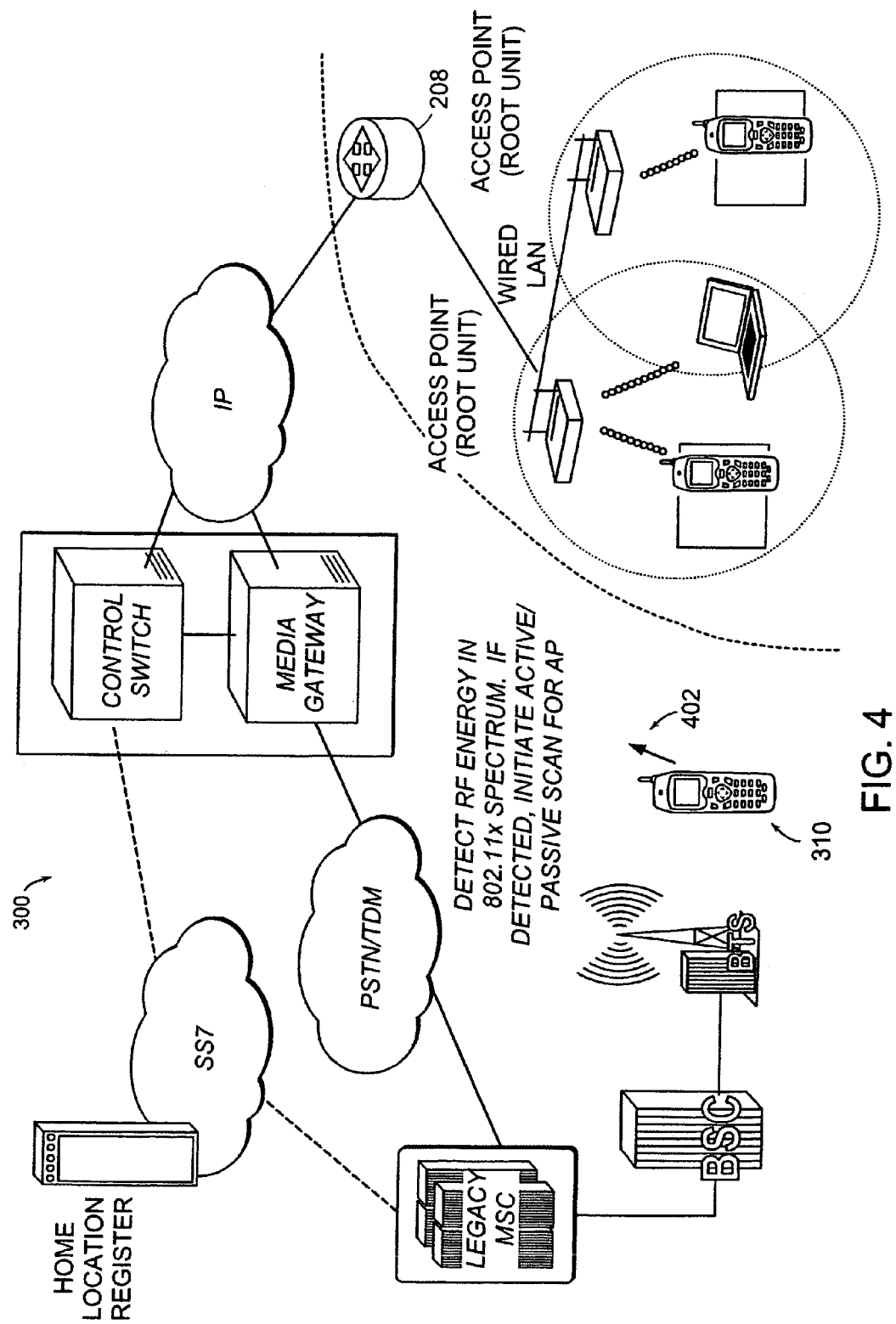
FIG. 4 shows a multimode mobile station detecting the presence of a WLAN according to certain embodiments of the invention.

The presence of a WLAN can be inferred by detecting RF energy in the permitted 802.11b/a spectrum (2.4 GHz band for 802.11b/802.1 g and 5 GHz band for 802.11a). As shown in FIG. 4, the mobile station 310 may initiate a detection 402 of RF energy in the relevant spectrum. After successful energy detection, the mobile station can detect if a valid WLAN 200 is present by one of the two methods:

Passive Scanning: the station 310 searches for a beacon frame broadcast by the 802.11x AP 204

Active Scanning: the station 310 transmits probe request frames and waits for probe response frames from the AP 204.

As part of the beacon frame or the probe response, the AP sends a SSID (1–32 octets length string) that identifies the AP 204. The mobile station 310 compares this SSID with a list of SSIDs (which may include ranges) and if there is a match, infers that the WLAN 200 is a valid network for it to gain access. The mobile station 310 goes through an authentication process after a successful SSID match. If the authentication succeeds, the mobile station proceeds with the association process whereby the mobile station joins the WLAN network as a valid and legal client (node).

The mobile station 310 is a priori provisioned with the valid list of SSIDs and SSID ranges. The SSID comparison avoids the mobile station from entering into authentication or association processes in functioning WLAN networks on which it could never be authenticated. For example, let the mobile station MS1 belong to Enterprise E1 that uses SSID En1SSID1. When the mobile station enters the Enterprise E1, the beacon search succeeds and further an SSID match occurs and hence the mobile station proceeds with the authentication process. On successful authentication, it proceeds with the association process and gains access to the WLAN service. When the same mobile station MS1 enters another enterprise that also happens to have a valid 802.11 WLAN but with a different SSID (say, En2SSID2) the SSID does not match the SSID in the mobile and hence the mobile station does not even attempt to initiate authentication (and hence presumes that the WLAN service is not available).

The provisioning of SSIDs in the mobile station can be initiated from the macro network 300 using over the air provisioning procedures (OTASP/OTAPA) in the case of CDMA networks and equivalent in GSM/UMTS networks (using Short Message Service). In order to prevent eavesdropping of the SSIDs in the macro network, the message itself could be encrypted using the same key used in the mobile station for macro network authentication/encryption (A-key or SSD).

The periodic detection and subsequent discovery of the presence of the WLAN impacts the battery life of the mobile station. It is desirable to minimize the battery consumption and one way to achieve this in the multimode phone is to minimize the number of detection or discovery attempts and at the same time preserving the ability to jump on to the enterprise WLAN if it is available. Two observations on the use of the multimode mobile stations 310 enable the reduction in the number of detection/discovery attempts:

The number of areas where the enterprise Wireless LAN service is available for the subscriber is limited; for example, enterprise subscribers may be limited to get access to their WLAN services in their enterprise locations only.

The multimode mobile station is always attempting to stay connected to the macro network (CDMA, GSM, UMTS, etc.). For example, a CDMA phone on detection of a valid IS-95/IS-2000 signal will attempt registration with the IS-41 core network; a GSM/UMTS phone on detection of a valid GSM/UMTS signal will attempt registration with the GSM-MAP core network. As a consequence of registration, the cell id that is known to both the macro network and the mobile station, indicates the current location of the mobile station.

Figure 5:
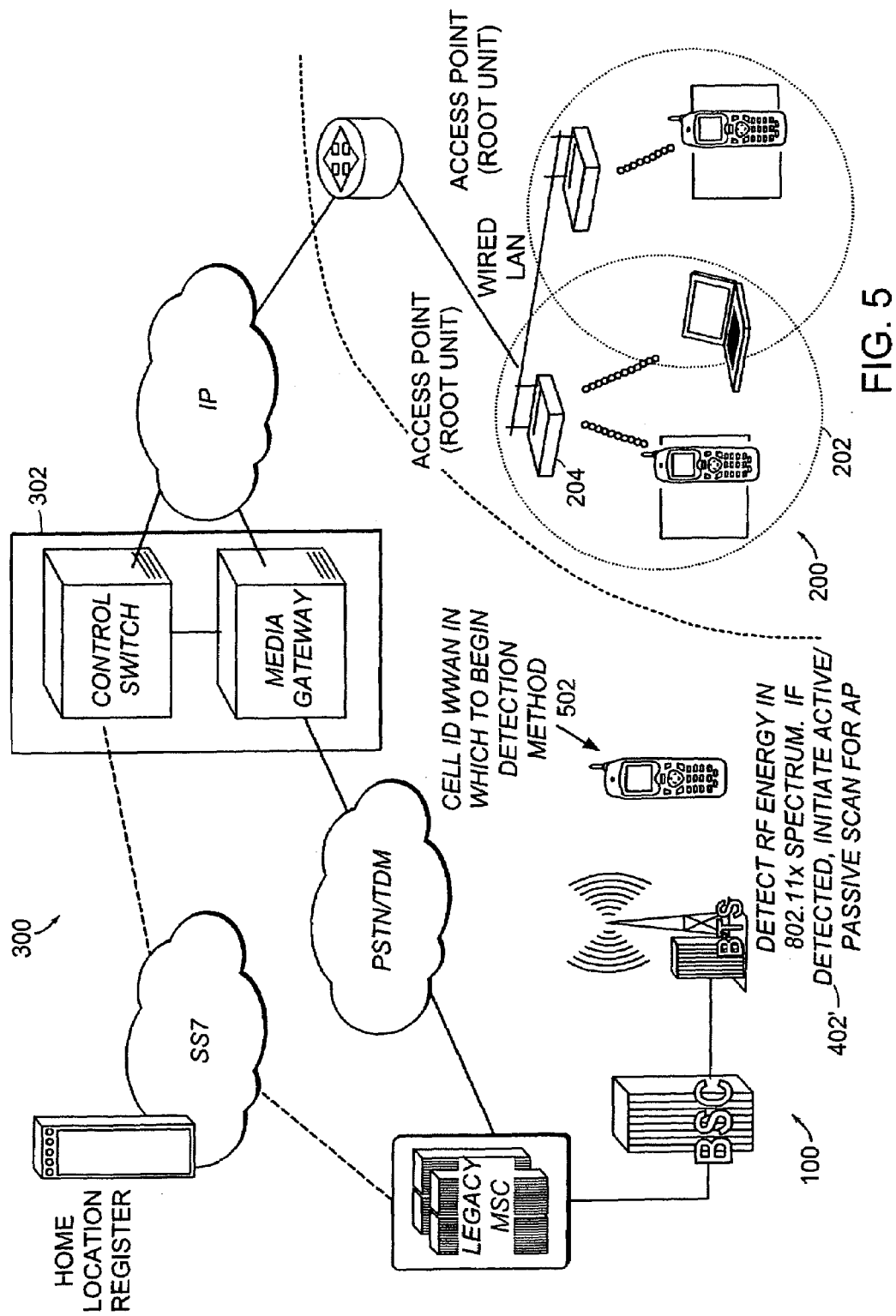
FIG. 5 shows a multimode mobile station receiving cell id information from the macro network identifying relevant areas in which the mobile station may sense for a WLAN according to certain embodiments of the invention.

By relating the above two facts, the macro network 300 can determine when the mobile station 310 should be attempting to detect or discover the enterprise WLAN. As shown in FIG. 5 in a preferred embodiment of the present invention, the macro network 300 can send 502 information regarding the detection or discovery process to the mobile station 310 on a successful network registration. The information includes the macro network cell-ids where the mobile station 310 should attempt to detect or discover 402' an enterprise WLAN. The cell-id is a gross measure and hence can cover a very large area (in the order of few square miles in rural/suburban areas) or a very small area (in the order of few hundred square meters in dense urban areas).

As an exemplary manifestation of the method of the present invention, consider a CDMA (IS-95) subscriber who is also an enterprise subscriber to 802.11 services in Building W located in Tewksbury, Mass. When the subscriber enters the CDMA switching area in Tewksbury, his IS-95 phone initiates a network registration. As part of this registration, the macro network 300 determines that the subscriber may possibly enter the coverage area of the WLAN service in Building W; that is, the macro network correlates the information that the subscriber and Building W are in the Tewksbury switching area. The macro network now provides 502 the cell-id information where the W building is located to the subscriber's mobile station 310 and a trigger that WLAN sensing should now begin. On receipt of this information, the mobile station starts to scan for the 802.11 beacon, specifically looking for a match with the SSID list of the APs in Building W. This detection will not succeed until the subscriber enters the BSS 202. Upon successful detection of the beacon from the AP 204, the mobile station 310 of the subscriber de-registers from the macro network 300 and registers with the serving MSC 302 for the WLAN 200. When the mobile station 310 roams in the WLAN 200, it continues to sense the RF energy strength of the WWAN 100 and WLAN 200. If it detects that the WLAN RF strength decreases below some threshold value and the WWAN strength is above a threshold value, it initiates a registration process with the macro (WWAN) network 100.

As mentioned before, the cell ids of the macro network 300 may designate very large geographical areas. If the cell id relates to a small geographical area then the chances of minimizing power consumption in the mobile station are better since the detection or discovery process is limited to the smaller geographical area. Under some embodiments the availability of GPS (Geographical Positioning Satellite) information integrated into the mobile stations may be used. Since GPS information is more accurate as compared to cell id information, the use of GPS information will further reduce the geographical area in which the detection or discovery process needs to be initiated, thus leading to more savings in the power consumption of the mobile station.

Figure 6:
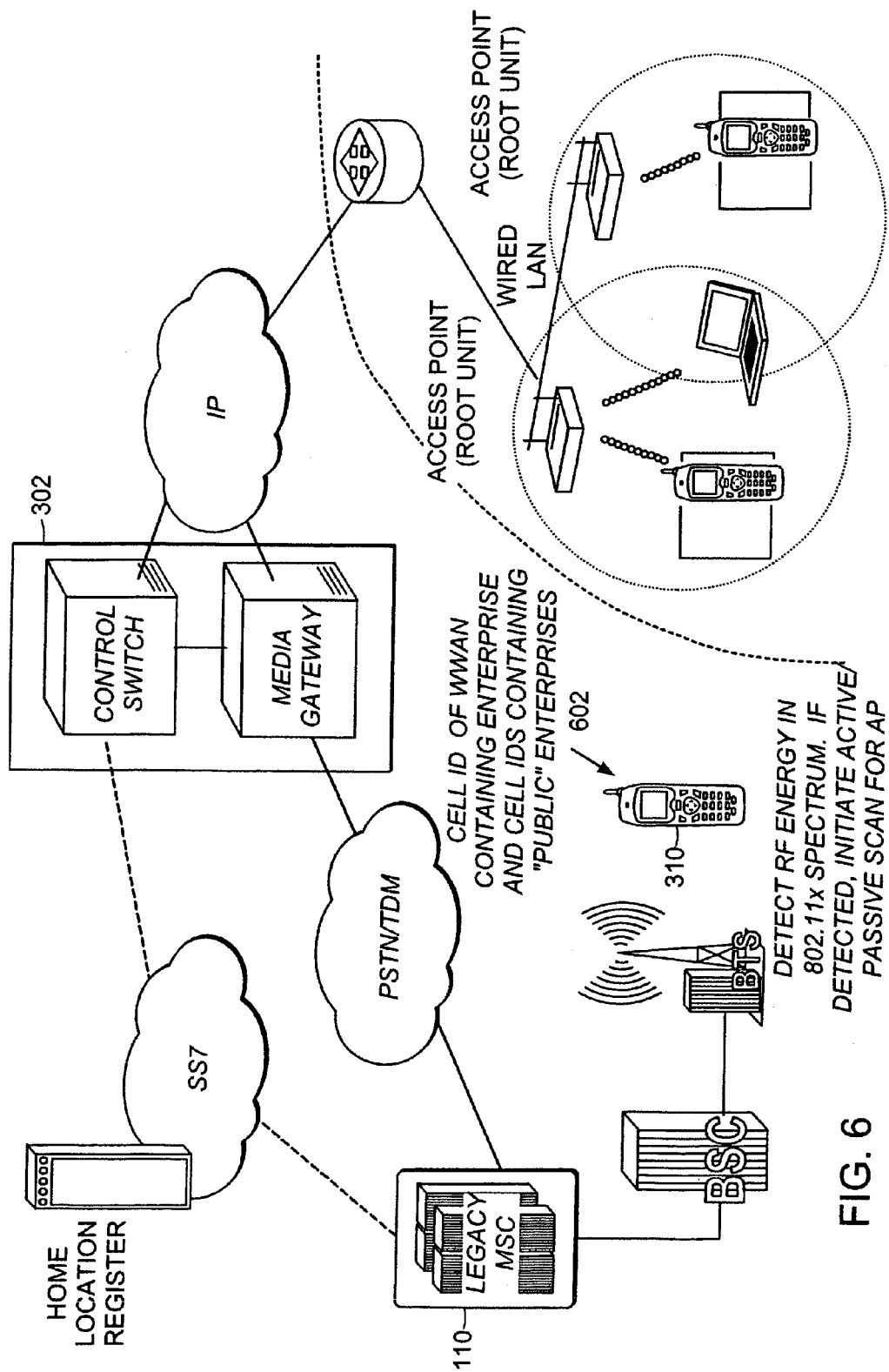
FIG. 6 shows a multimode mobile station receiving cell id information from the macro network identifying public and other enterprise WLANs according to certain embodiments of the invention.

The list of cell-ids provided by the macro network to the mobile station can consist not only of enterprise locations that the subscriber can roam into but potentially other "enterprises" or "public areas" as well. For example, the macro network service provider may have a roaming arrangement with a public enterprise LAN such as a restaurant or a hotel. Referring to FIG. 6, when a subscriber 310 registers with the macro network, it would be beneficial to also receive 602 the cell-ids where the subscriber's enterprise is located but also the cell-ids where the public LANs are located in the same switching area.

The delivery of the location information or more direct instruction to start (or stop) searching for WLAN beacon in the mobile station 310 can be accomplished using standard Short Message Service (SMS), or by using logic based in a Service Control Point (SCP), or by modifying the the HLR or using a Proxy HLR entity. (See, e.g., U.S. Pat. application Ser. No. 09/845,703, filed Apr. 30, 2001 for an example of a proxy HLR, which application is hereby incorporated by reference in its entirety.) When the mobile station 310 registers with the MSC/HLR, the macro network can deliver the cell-id list, beacon search/stop instruction etc., as a SMS (short message service) with a specific type. The SMS message is sent after a successful response to the Location Update initiated by the mobile station 310. The MSC 302 can have switch based logic that initiates a trigger on location update that causes a switch resident or Service Control Point (SCP) resident application to generate the SMS message with the cell-ids. For example, a switch could be programmed to trigger an SCP on receipt of a location update. The SCP-resident logic may then send the location and sensing instructions to the mobile station. Alternatively, the HLR 114 can be modified to perform the same task on successful processing of an IS-41REGNOT request or GSM-MAP UPDATE LOCATION request. In other embodiments, a Proxy HLR may be employed. The Proxy HLR intercepts all messages intended for the HLR from the MSC. Registration messages received from the multimode WWAN and WLAN clients are handled by the Proxy HLR whereas messages from all the other clients are forwarded to the HLR without any modifications.

Figure 7:
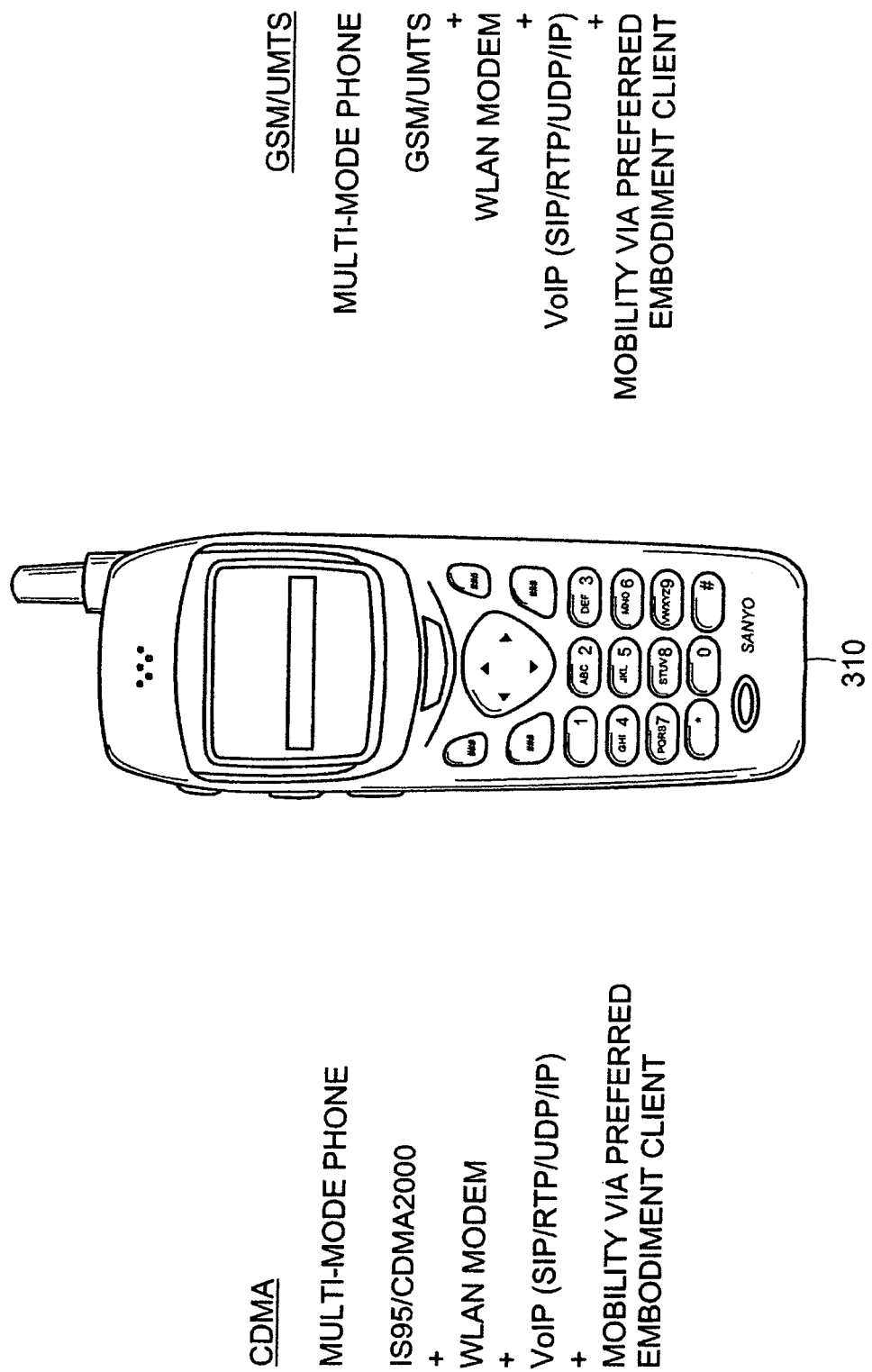
FIG. 7 shows a multimode mobile station according to certain embodiments of the invention.

FIG. 7 shows a handset 310 according to exemplary embodiments of the present invention. For example, the handsets include logic to communicate according to a WLAN air interface protocol (such as 802.xx) and to communicate according to a WWAN air interface protocol. As described herein, the mobile station may select to use one of the air interface logic units based on its sensing of relevant radio spectrum. Moreover, a handset may support more than one WWAN macro network technology. For CDMA handsets it is assumed that a WLAN modem will be added to the handset. Additionally, the capability to transport voice as SIP/RTP/UDP/IP packets will be needed. The network sensing method discussed in the previous section along with the modifications required to reduce the detection and discovery traffic by utilizing cell-ids, in the preferred embodiment of the present invention, are to be captured by special computer programs running on the computing platform of the handset.

Figure 8:
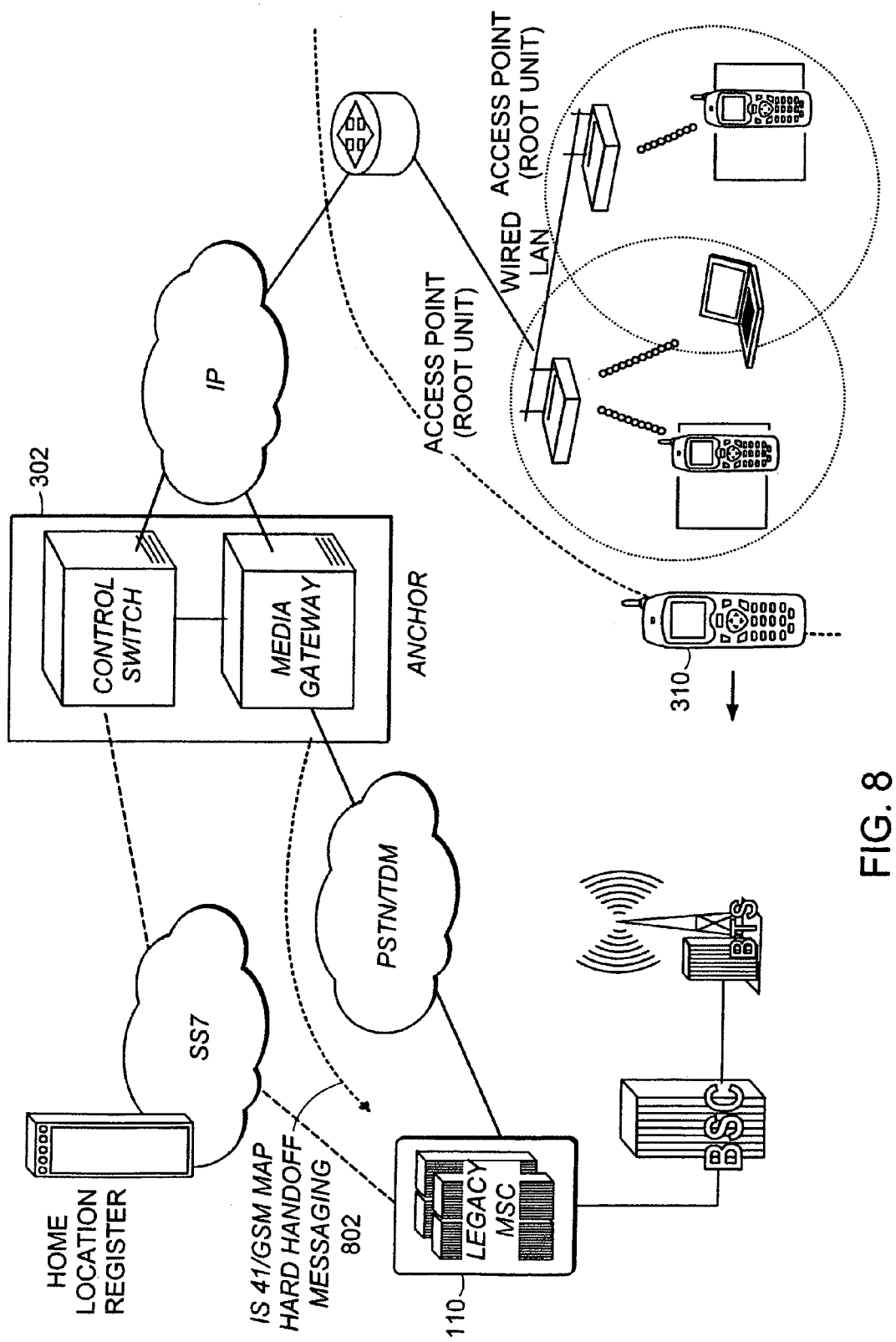
FIG. 8 shows an internetworked wireless network according to certain embodiments of the invention in which a mobile station may roam from a WLAN environment and/or in which a handoff of servicing a mobile station from a WLAN to a WWAN occurs.

FIG. 8 shows the movement of a mobile station 310 from a WLAN environment 200 to a WWAN environment 100. Under certain embodiments of the invention, the mobile station 310 registers in the WWAN environment 100 as it roams from the WLAN 200 into the WWAN. Likewise the appropriate handoff must be made as well. The mobile station 310, using the network sensing method described above, infers that it needs to register with the WWAN environment.

Figure 9:
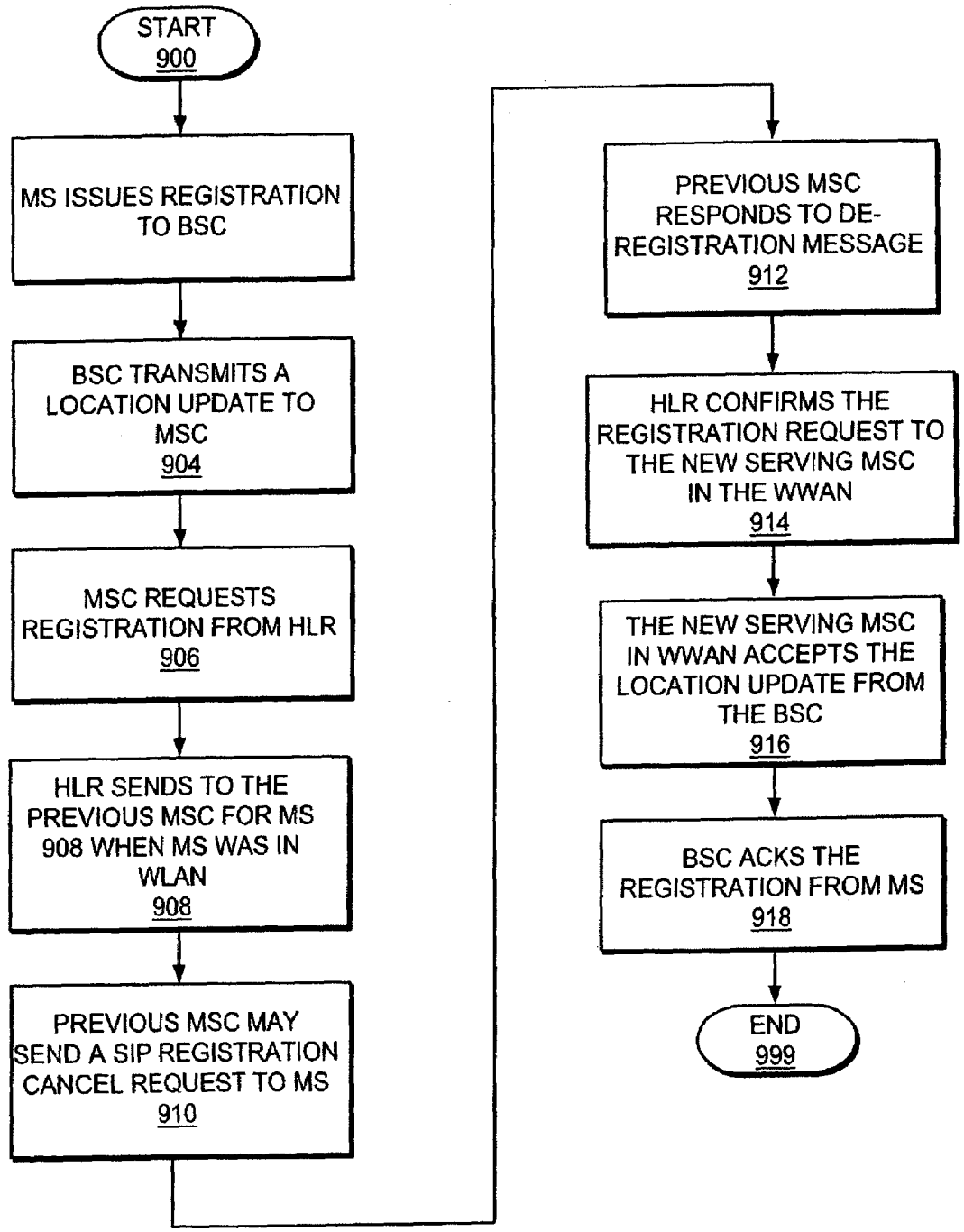
FIG. 9 shows mobility management logic according to certain embodiments of the invention.

Mobile Station (MS) leaves WLAN and enters WWAN: Referring to FIGS. 8 and 9, the registration and handoff are implemented in certain embodiments as follows. The logic starts at 900 and proceeds to 902 in which the mobile station 310 issues a registration request to the (new) serving base station controller (BSC) 106 in the WWAN. The BSC 106 transmits 904 a Location Update message to its serving MSC 110. The serving MSC 110 in the WWAN requests 906 a registration from the HLR 114. The HLR 114 sends 908 a de-registration request to the (previous) serving MSC 302 in WLAN. Optionally, the (previous) serving MSC 302 may send 910 a SIP registration cancel request to the mobile station 310 that will respond with a confirmation. This may facilitate "clean up" or "tear down" at the mobile station, since it is no longer communicating via the WLAN. The (previous) serving MSC 302 responds 912 to the de-registration message to the HLR 114. The HLR confirms 914 the registration request to the (new) serving MSC 110 in the WWAN. The (new) serving MSC 110 accepts 916 the Location Update from the BSC 106. The BSC 106 acknowledges 918 the registration from the mobile station 310.

Figure 10:
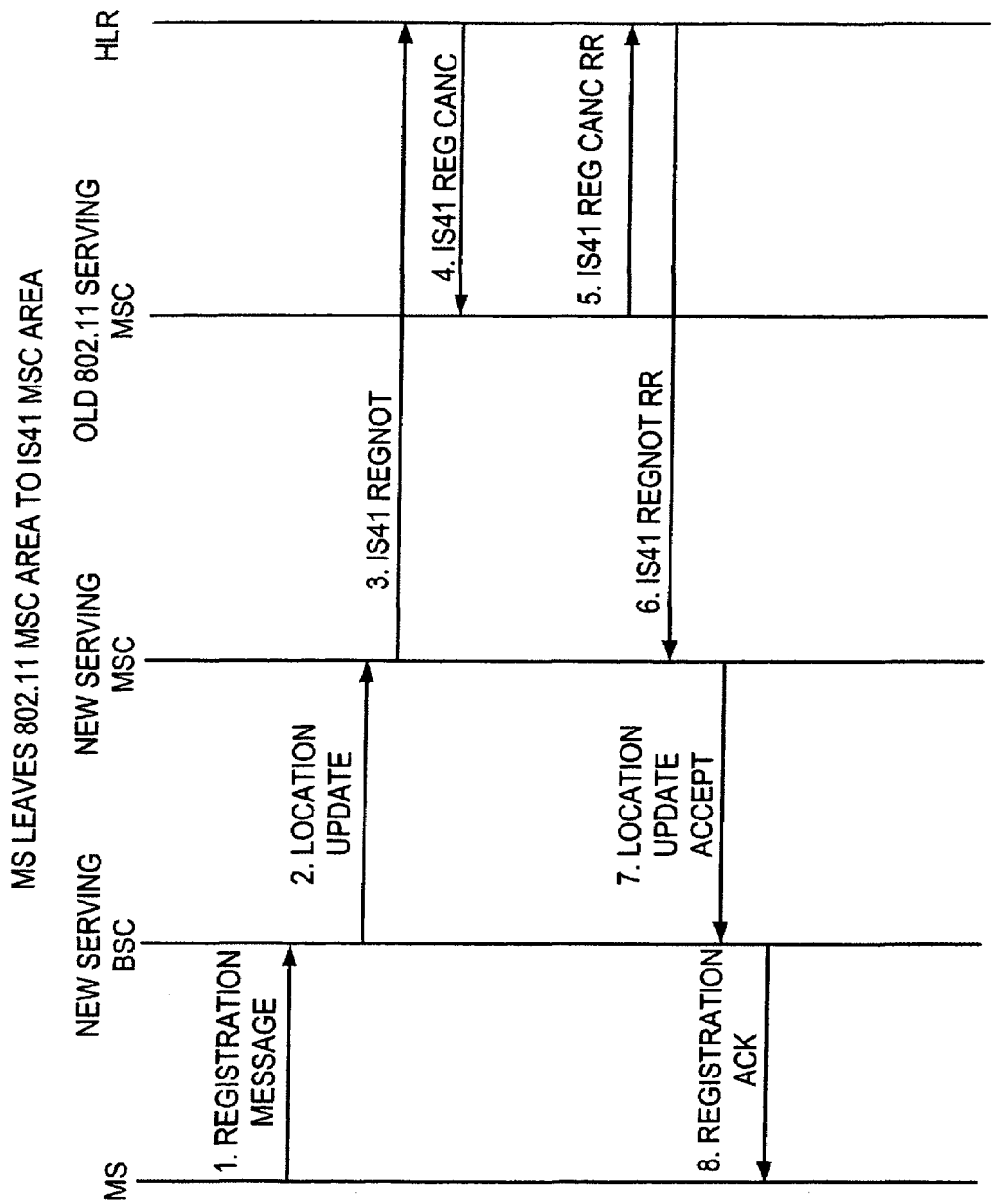
FIGS. 10-11 show specific mobility management logic according to certain embodiments of the invention.
Figure 11:
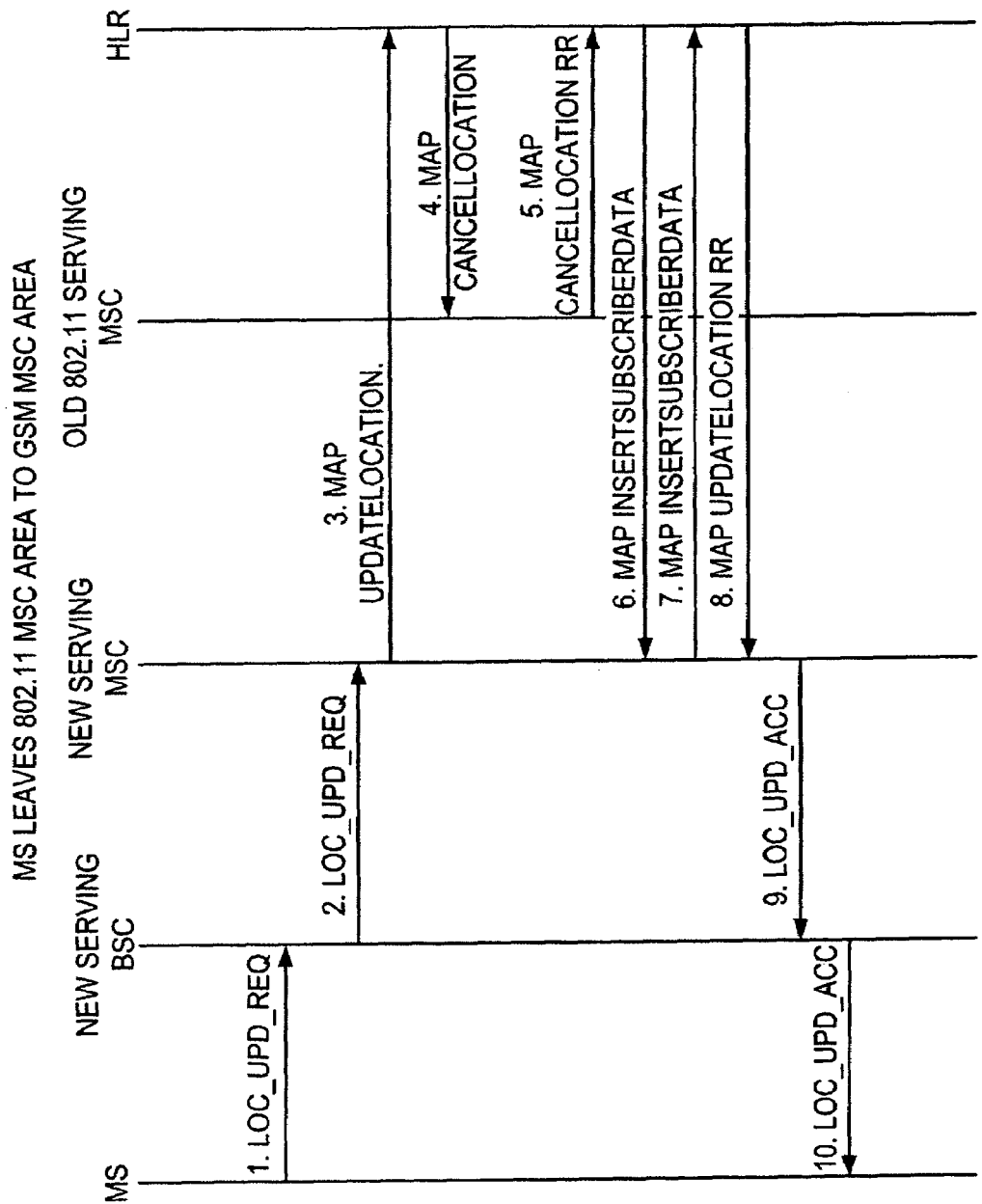

In an exemplary embodiment of the present invention, if the WWAN is an IS-41 network then the registration, de-registration and confirmatory messages will use IS-41 protocol elements. The various specific messages used, as explained with reference to FIG. 9, are shown in FIG. 10. In another exemplary embodiment, if the WWAN is a GSM-MAP network then the registration, de-registration and confirmatory messages will use GSM-MAP protocol elements. The various specific messages used as explained with reference to FIG. 9 are shown in FIG. 11.

Hard Handoff from WLAN to WWAN: In this case, the mobile station 310, while engaged in a telephone call, roams from WLAN 200 to WWAN 100. The WLAN environment needs to handoff 802 the mobile station 310 from the WLAN serving MSC 302 to WWAN serving MSC 110. Since the mobile station 310 is engaged in a call within WLAN, the SIP client is managing the call in the mobile station 310. This client needs to inform the WLAN serving MSC 302 the cell ids of the WWAN macro network. In the preferred embodiment of the present invention, the SIP command "SIP INFO" is overloaded with this cell id information. The overloaded information elements are so indicated in the logic described below in connection with FIG. 12.

The logic starts at 1200 and proceeds to 1202 in which the mobile station 310 informs the WLAN serving MSC (Source MSC) 302 that a handoff is required. This may be based on the network sensing method. As discussed above, in the network sensing method, the mobile station 310 senses both the WLAN and the WWAN networks and chooses one of them based on the relative RF strengths. During the sensing procedure, the cell id of the WWAN network becomes known to the mobile station 310. The mobile station 310 uses the cell id to initiate a hard handoff to the WWAN network from the WLAN network. In the handoff required message the cell id of the WWAN network is sent to the WLAN switch. This is an overloaded SIP command. The cell id is used so that the MSC that was serving the WLAN and is now the anchor knows which other MSC to connect to. The source MSC 302 issues 1204 a facility directive (FD) to the WWAN MSC (Target MSC) 110 that allows it open a bearer channel on PSTN 112 (for example) from Source MSC 302 to Target MSC 110. This allows the source MSC to serve as an anchor for the communication, having a new "leg" to the target MSC and an existing pathway to the other entity(ies) on the existing call. The Target MSC 110 sends 1206 a handoff request to the (Target) BSC 106. The Target BSC 106 commences 1208 RF channel signaling with the mobile station 310. The Target BSC 106 sends 1210 handoff request acknowledgement to Target MSC 110. The Target MSC 110 responds 1212 to the facility directive request back to the Source MSC. The Source MSC 302 sends 1214 a message to the mobile station 310 indicating that a handoff may be commenced. For example, this message may be sent as an overloaded SIP message. This message effectively informs the mobile station that it may select and start using the appropriate RF and modulation circuitry to communicate with the WWAN. The mobile station 310 sends 1216 a message to the source MSC 302 to commence handoff. Again, this message may be sent as an overloaded SIP message. The mobile station 310 commences 1218 RF channel signaling with Target BSC 106. The mobile station 310 sends 1220 handoff completion message to Target BSC 106. Again, this message may be sent as an overloaded SIP message. The Target BSC 106 acknowledges 1222 handoff order to the mobile station 310. The Target BSC 106 sends 1224 handoff complete message to Target MSC 110. The Target MSC 110 sends 1226 message to Source MSC 302 indicating that the mobile station 310 is on channel with Target BSC 106. The Source MSC 302 sends 1228 a message to the mobile station 310 indicating that it may clear any resources assigned this transaction. The mobile station 310 responds 1230 with OK acknowledgement.

Figure 12:
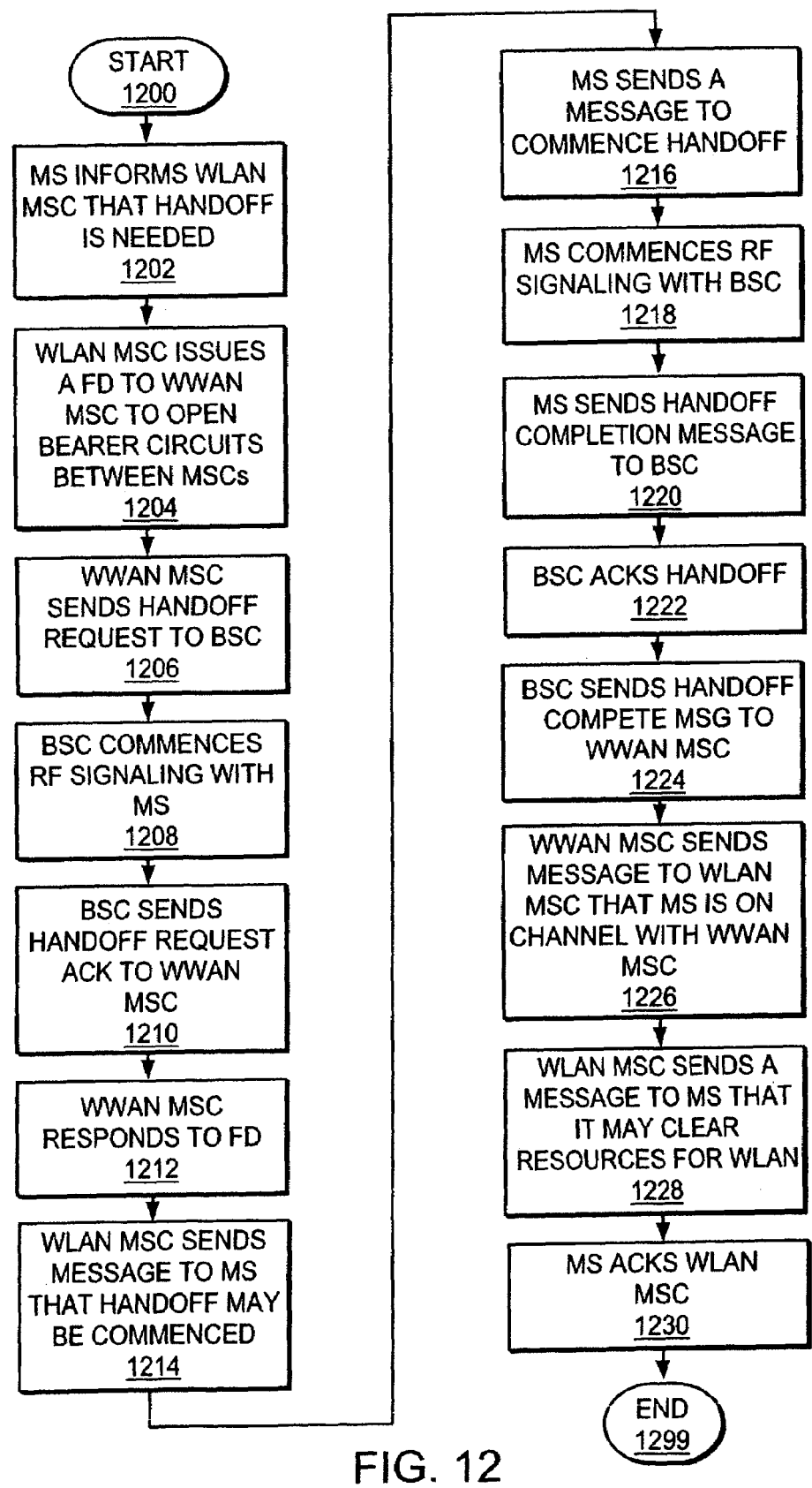
FIG. 12 shows mobility management logic according to certain embodiments of the invention.
Figure 13:
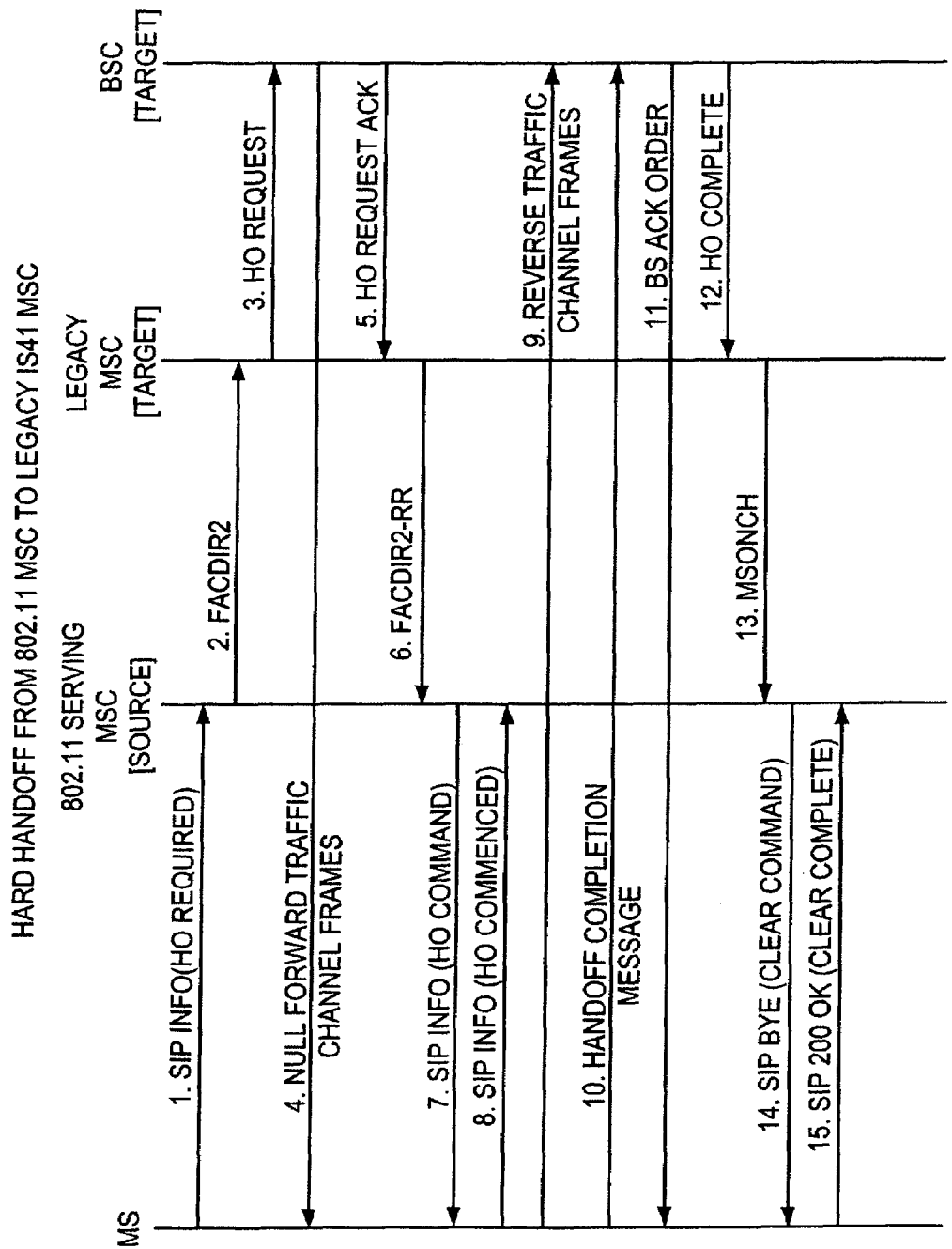
Figures 14, 14A:
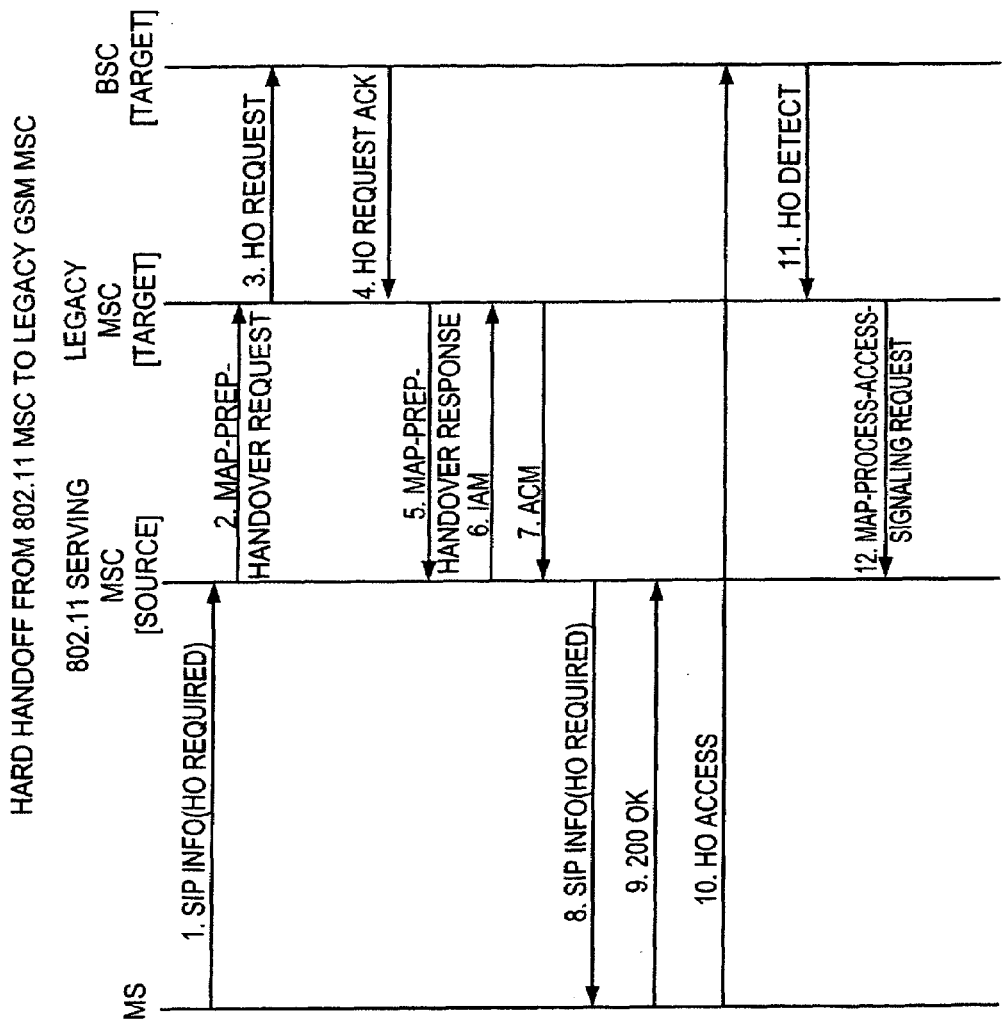
Figure 14B:
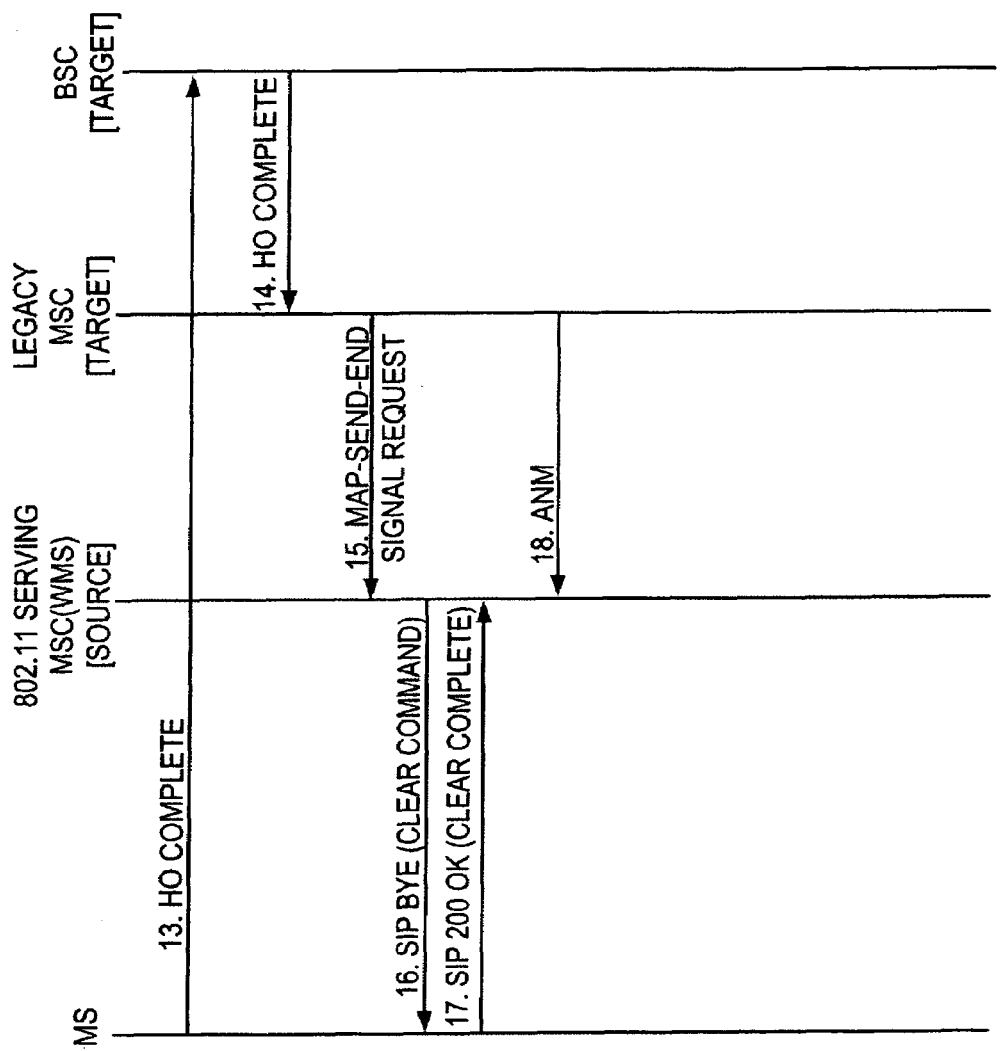

In an exemplary embodiment of the present invention, if the WWAN is an IS-41 network then the messages, excluding the overloaded messages, will use IS-41 protocol elements. The various specific messages used as explained with reference to FIG. 12 are shown in FIG. 13. In another exemplary embodiment, if the WWAN network is a GSM-MAP network, the protocol elements used will be GSM-MAP. The various specific messages used as explained with reference to FIG. 12 are shown in FIG. 14.

Figure 15:
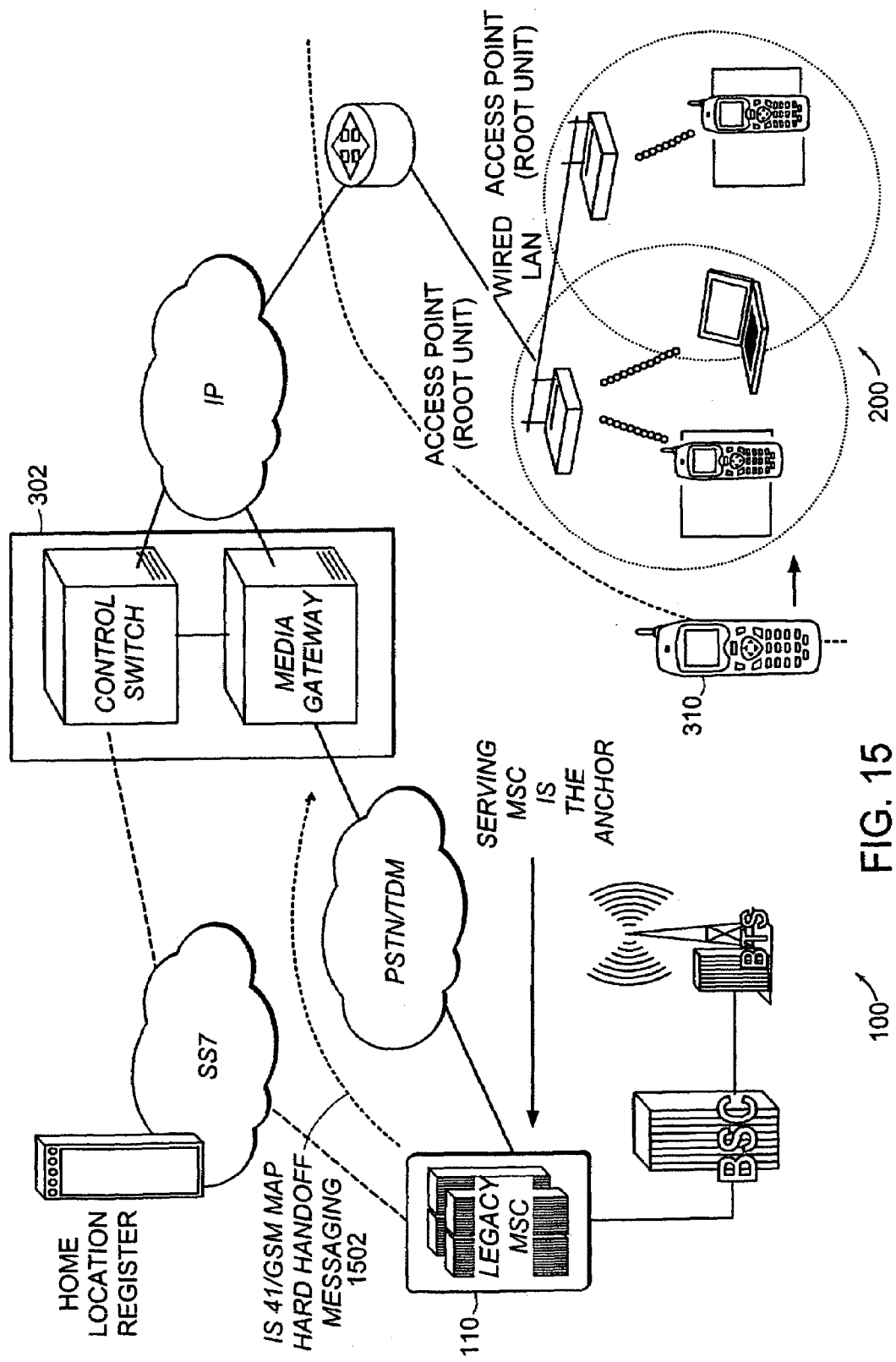
FIG. 15 shows an internetworked wireless network according to certain embodiments of the invention in which a mobile station may roam from a WWAN environment and/or in which a handoff of servicing a mobile station from a WWAN to a WLAN occurs.

FIG. 15 shows the case of the mobile station 310 roaming from a WWAN 100 to WLAN 200 environment. The mobile station 310, using the network sensing method described above, senses the RF strength in the proximity of the WLAN and decides to start using the WLAN environment, thus initiating a registration request. As outlined above, the mobile station may use the cell id information to determine when to start sensing the WLAN.

Figure 16:
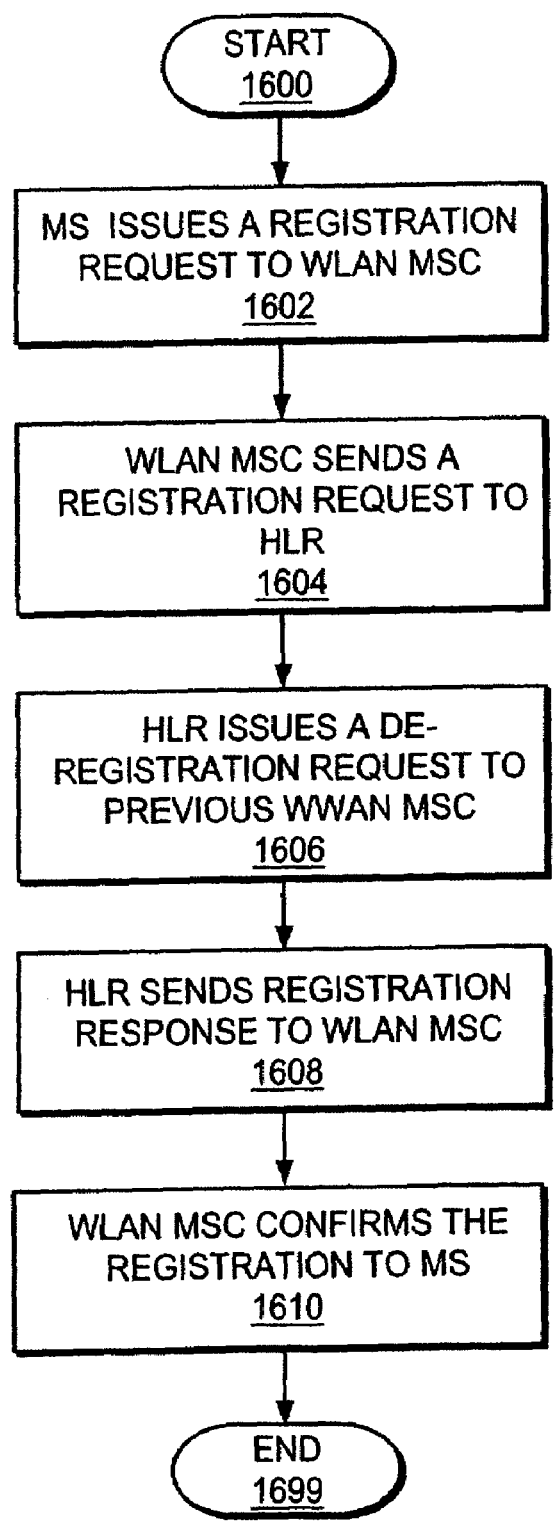
FIG. 16 shows mobility management logic according to certain embodiments of the invention.

Mobile Station (MS) enters WLAN from WWAN: As the mobile station 310 enters a WLAN 200 from a WWAN 100, the logic of FIG. 16 is followed. The logic starts in 1600 and proceeds to 1602 in which the mobile station 310 issues 1602 a registration request to the WLAN Serving MSC 302 upon sensing the WLAN RF energy strength, as described above. This is done via a SIP message (e.g., a broadcast message), which the WLAN Serving MSC receives. The WLAN Serving MSC 302 sends 1604 a registration request to the HLR 114. The HLR issues 1606 a de-registration request to the (previously) Serving WWAN MSC 110. Upon confirmation of de-registration, the HLR sends 1608 a registration response confirmation to the WLAN MSC 302. The WLAN MSC 302 confirms 1610 the registration to the mobile station 310.

Figure 17:
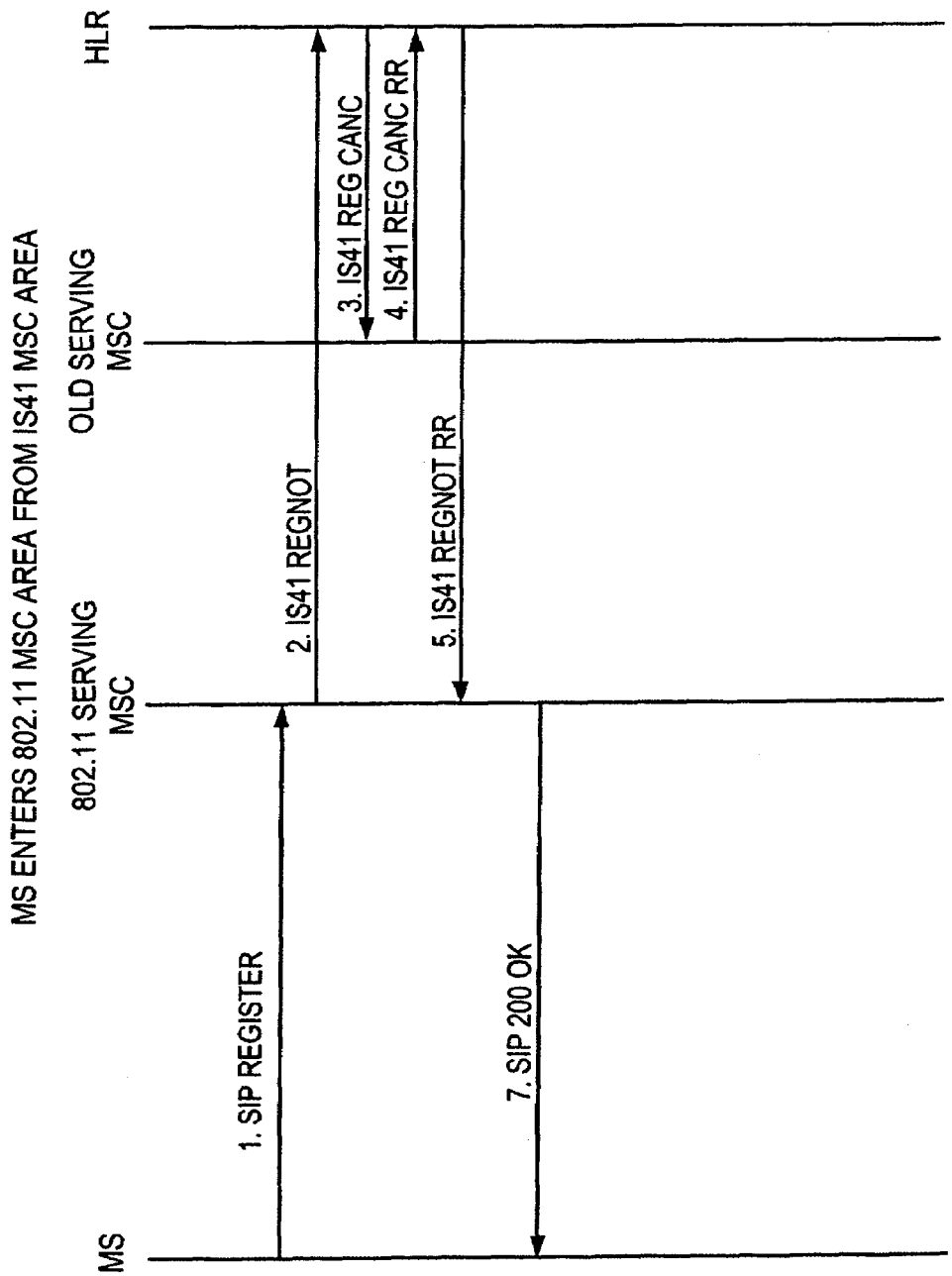
Figure 18:
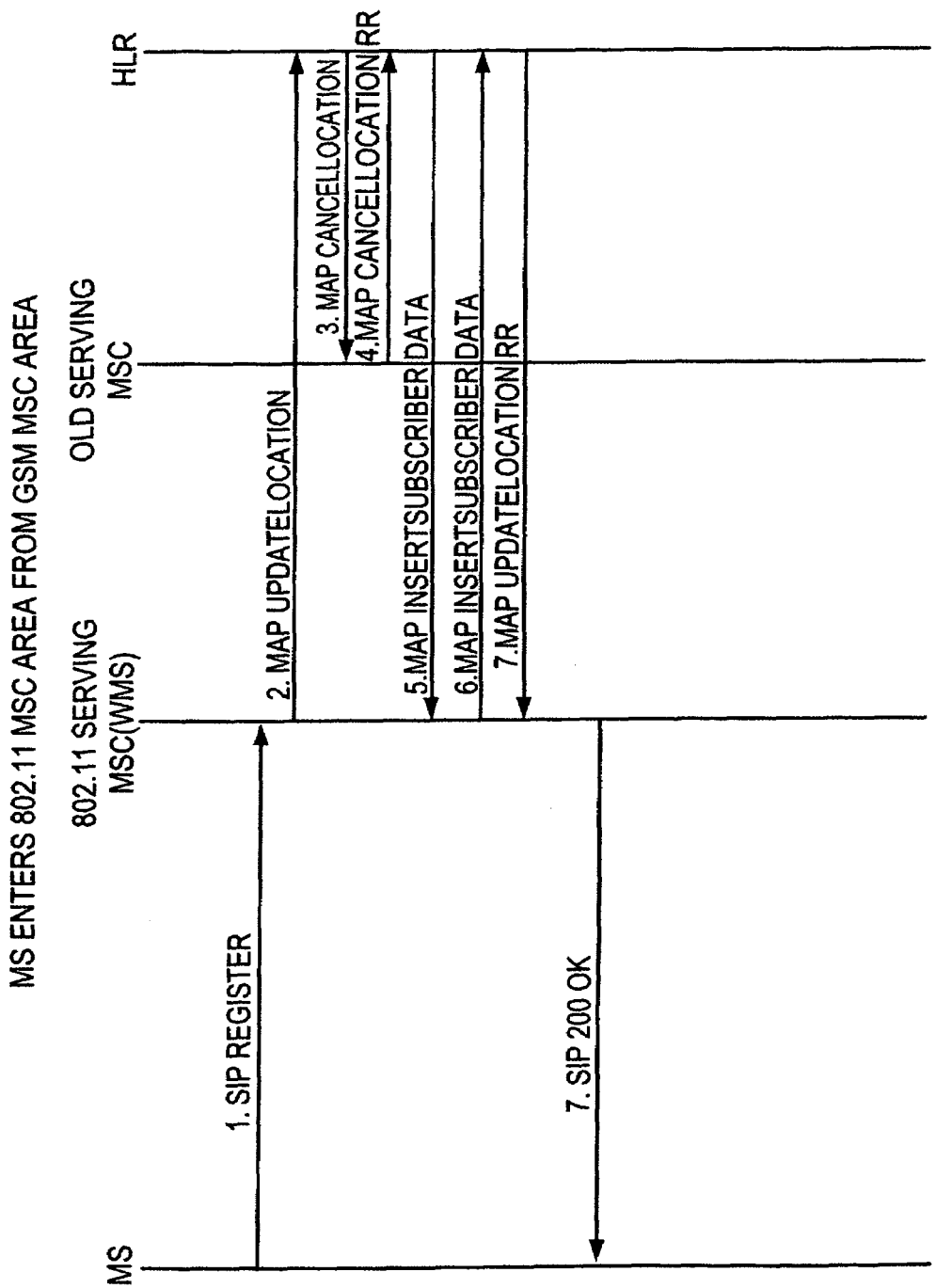

In an exemplary embodiment of the present invention, a mobile station 310 roams from IS-41 WWAN to 802.11 WLAN. The various specific messages used as explained with reference to FIG. 16 are shown in FIG. 17. In a preferred embodiment of the present invention, the mobile station 310 issues a "SIP Register" message to the WLAN Serving MSC 302 that sends a IS-41 Registration Notification (REGNOT) to the HLR 114. The HLR sends a Registration Cancellation request to the WWAN MSC 110 that was serving the mobile station 310 (to de-register the mobile station) and upon receiving a confirmation of the de-registration, sends a confirmation of registration to the WLAN Serving MSC 302 which then sends a "SIP 200 OK" (confirmation) message back to the mobile station 310, completing the transaction. In another exemplary embodiment of the present invention, if the mobile station 310 enters 802.11 WLAN from GSM-MAP WWAN, the registration, de-registration and confirmation messages from the HLR will employ the corresponding GSM-MAP protocol elements. The various specific messages used as explained with reference to FIG. 16 are shown in FIG. 18.

Hard Handoff from WWAN to WLAN: In this case the mobile station 310, while engaged in a telephone call, roams from WWAN 100 to WLAN 200. The unified WLAN and WWAN environment needs to handoff 1502 the mobile station 310 from the WWAN Serving MSC 110 to WLAN Serving MSC 302. Certain embodiments of the invention implement such a handoff using the logic of FIG. 19.

The logic begins at 1900 and proceeds to 1902 in which the BSC 106 serving the mobile station 310 (Serving BSC) decides 1902, based upon information received from the mobile station 310 that may be using the Network Sensing Method described above, that a handoff is required. It sends a handoff required message to the Source MSC 110. The Source MSC 110 issues 1904 a facility directive to the WLAN MSC (Target MSC) 302 that allows it to open a bearer channel on PSTN 112 from Source MSC 100 to Target MSC 302. The mobile station 310 sends 1906 a handoff request to the Target MSC 302; under certain embodiments of the present invention, this message is sent using SIP with overloaded commands. The Target MSC 302 acknowledges 1908 the request. The mobile station 310 acknowledges 1910 the response of the Target MSC 302. The Target MSC 302 responds 1912 to facility directive request to Source MSC 110. The Source MSC 110 sends 1914 a message to Source BSC 106 that a handoff may be commenced. The Source BSC 106 sends 1916 a handoff directive to mobile station 310. The mobile station 310 sends 1918 a message to acknowledge. The Source BSC 106 sends 1920 a message to Source MSC 110 that handoff has commenced. The mobile station 310 sends 1922 handoff completion message to Target MSC, again via an overloaded SIP message. The target MSC acknowledges 1924 handoff order to mobile station 310. The Target MSC 302 sends 1926 message to Source MSC 110 indicating that the mobile station 310 is on channel with target MSC. The Source MSC 110 sends 1928 a message to Source BSC 106 to clear facilities. The Source BSC 106 responds 1930 with OK clear complete.

Figure 19:
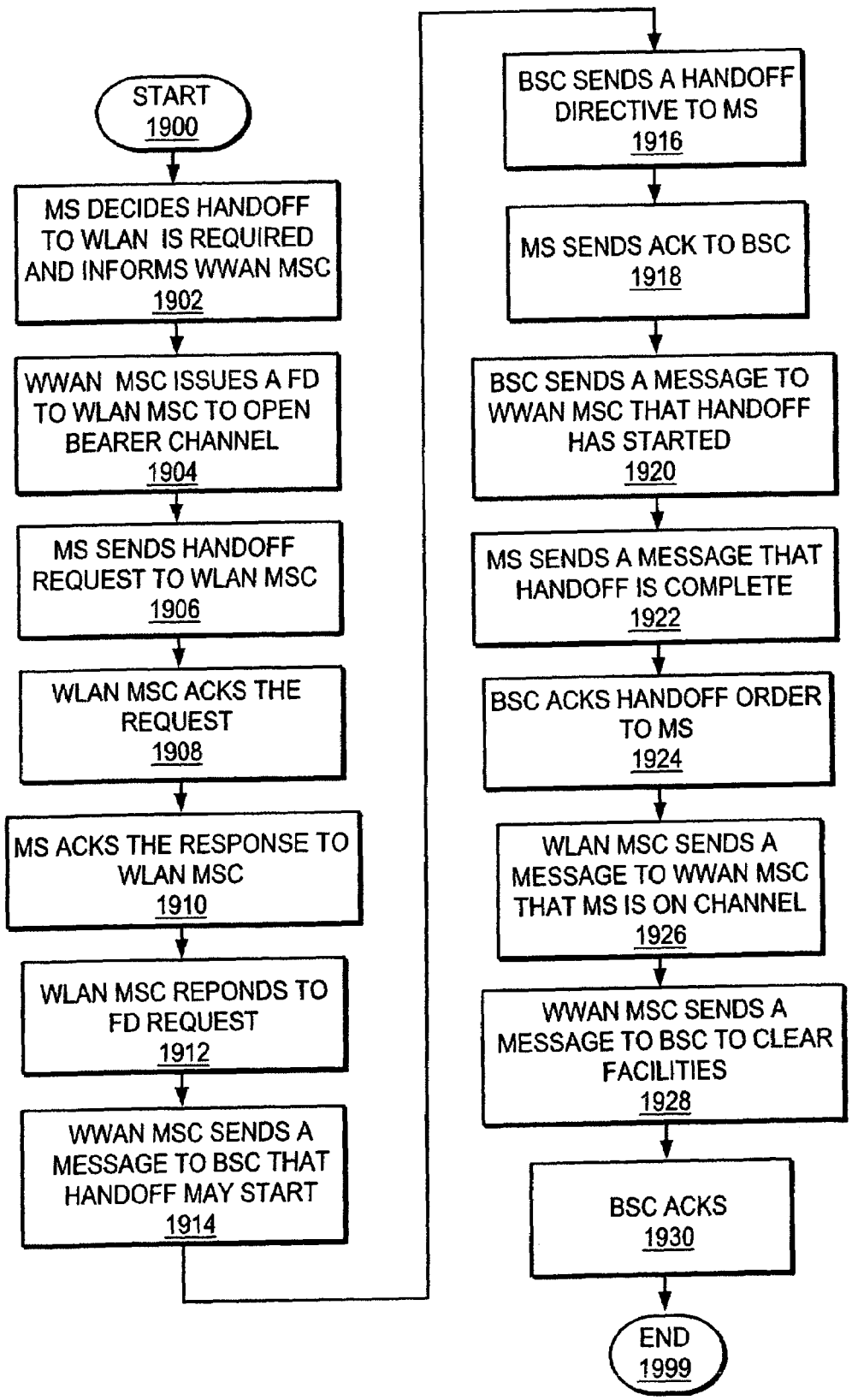
FIG. 19 shows mobility management logic according to certain embodiments of the invention.
Figure 20:
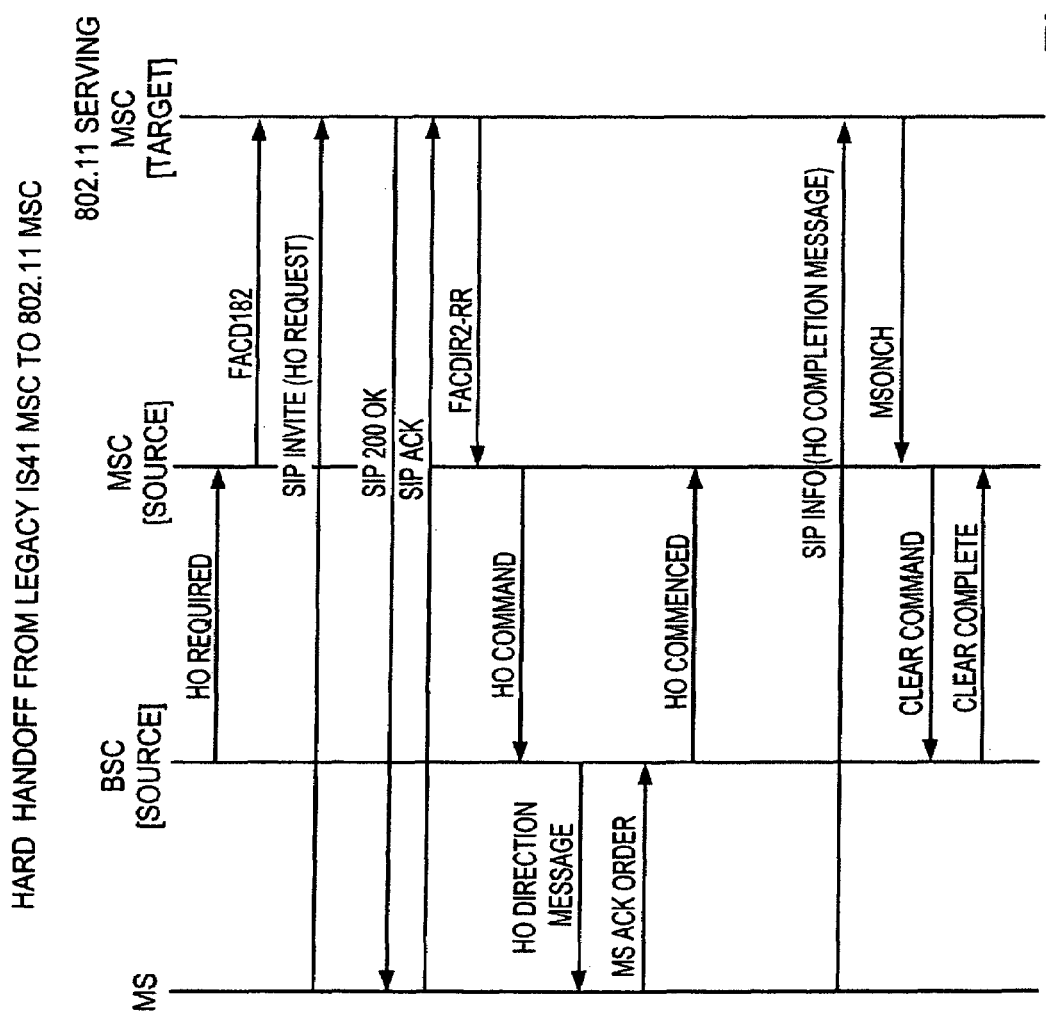
Figure 21:
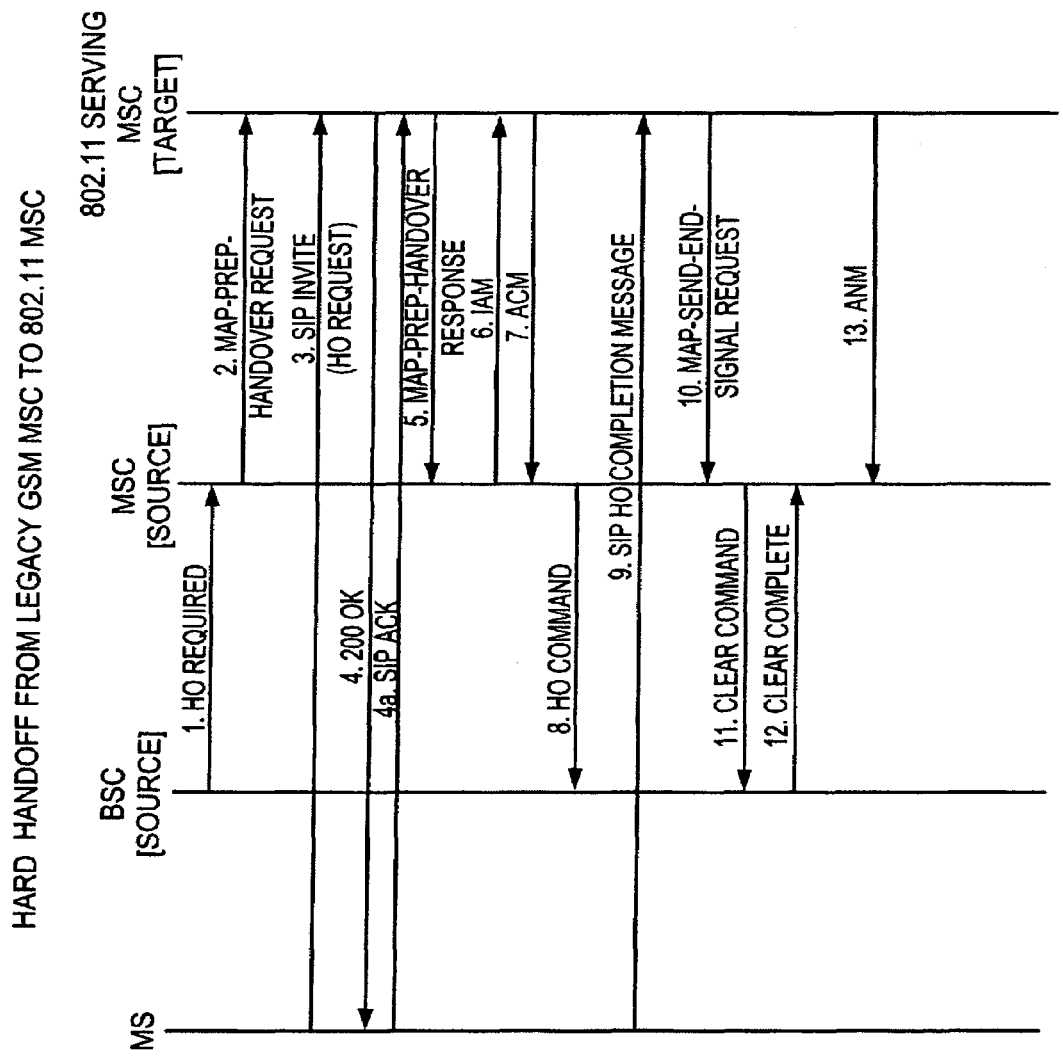

In an exemplary embodiment of the present invention, if the WWAN is an IS-41 network then the messages, excluding the overloaded messages, will use IS-41 protocol elements. The various specific messages used as explained with reference to FIG. 19 are shown in FIG. 20. In another exemplary embodiment, if the WWAN network is a GSM-MAP network, the protocol elements used will be GSM-MAP. The various specific messages used as explained with reference to FIG. 19 are shown in FIG. 21.

Figure 22:
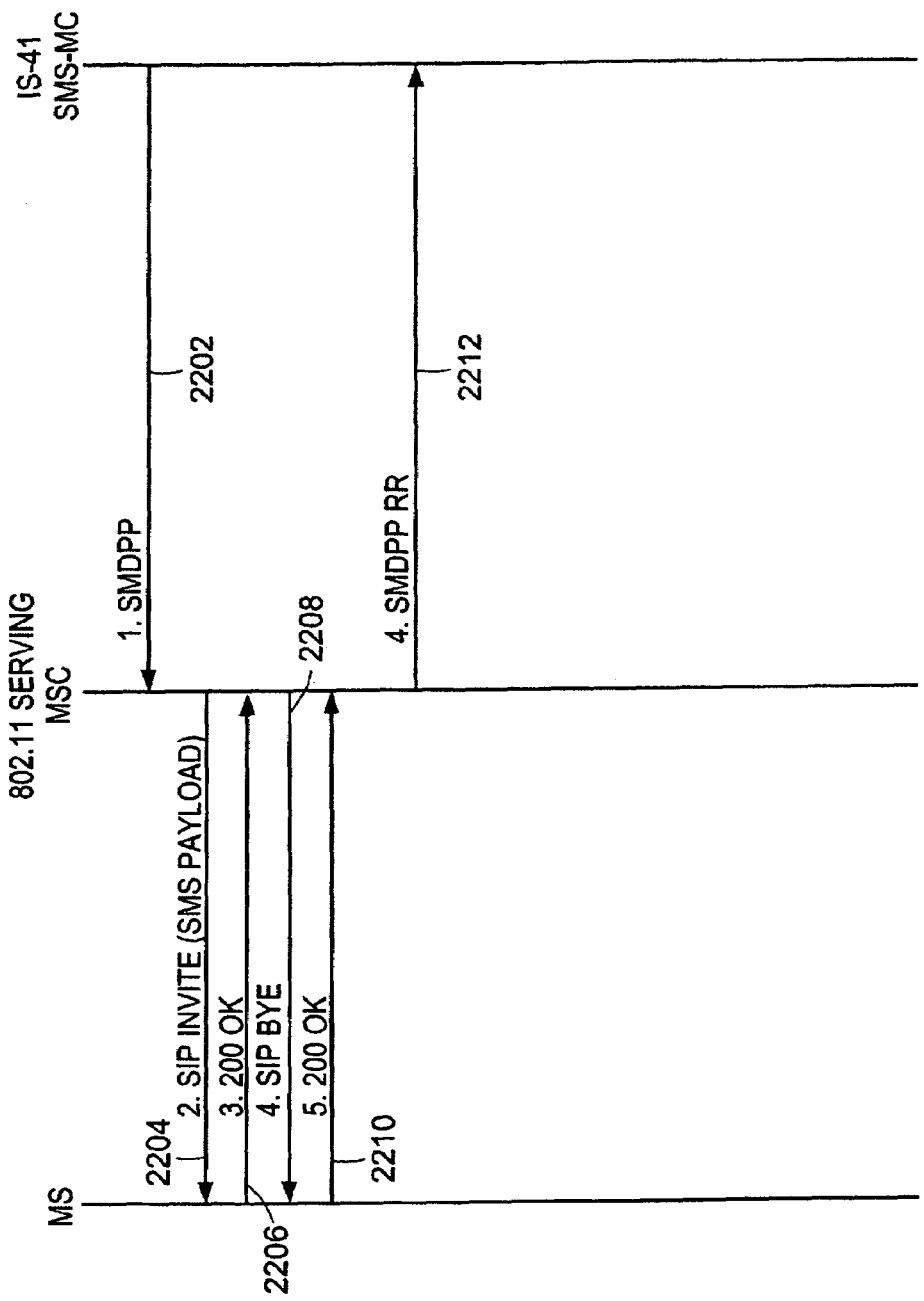
FIG. 22 shows logic for providing SMS to a mobile station operating in a WLAN environment according to certain embodiments of the invention.

Delivery of Short Message Service (SMS) in WLAN: SMS is a service that is typically supported in the WWAN 100 by a network entity known as the Short Messaging Service Center (SMSC). A mobile station 310 while roaming in a WLAN 200 preferably supports SMS service. Under certain embodiments the logic of FIG. 22 implements the SMS service in WLAN 200.

The SMS Messaging Center sends 2202 a SMS request (Short Message Delivery Point to Point—SMDPP) to the WLAN Serving MSC 302. In certain embodiments of the present invention the Serving MSC 302 overloads and sends 2204 the SIP INVITE message with SMS payload to the mobile station 310. The mobile station 310 responds 2206 with an OK acknowledgement. Serving MSC 302 indicates 2208 to the MS that the transaction is complete. The mobile station 310 responds 2210 OK. The Serving MSC 302 responds 2212 with SMDPP Request Response to the SMS Message Center.

Figure 23:
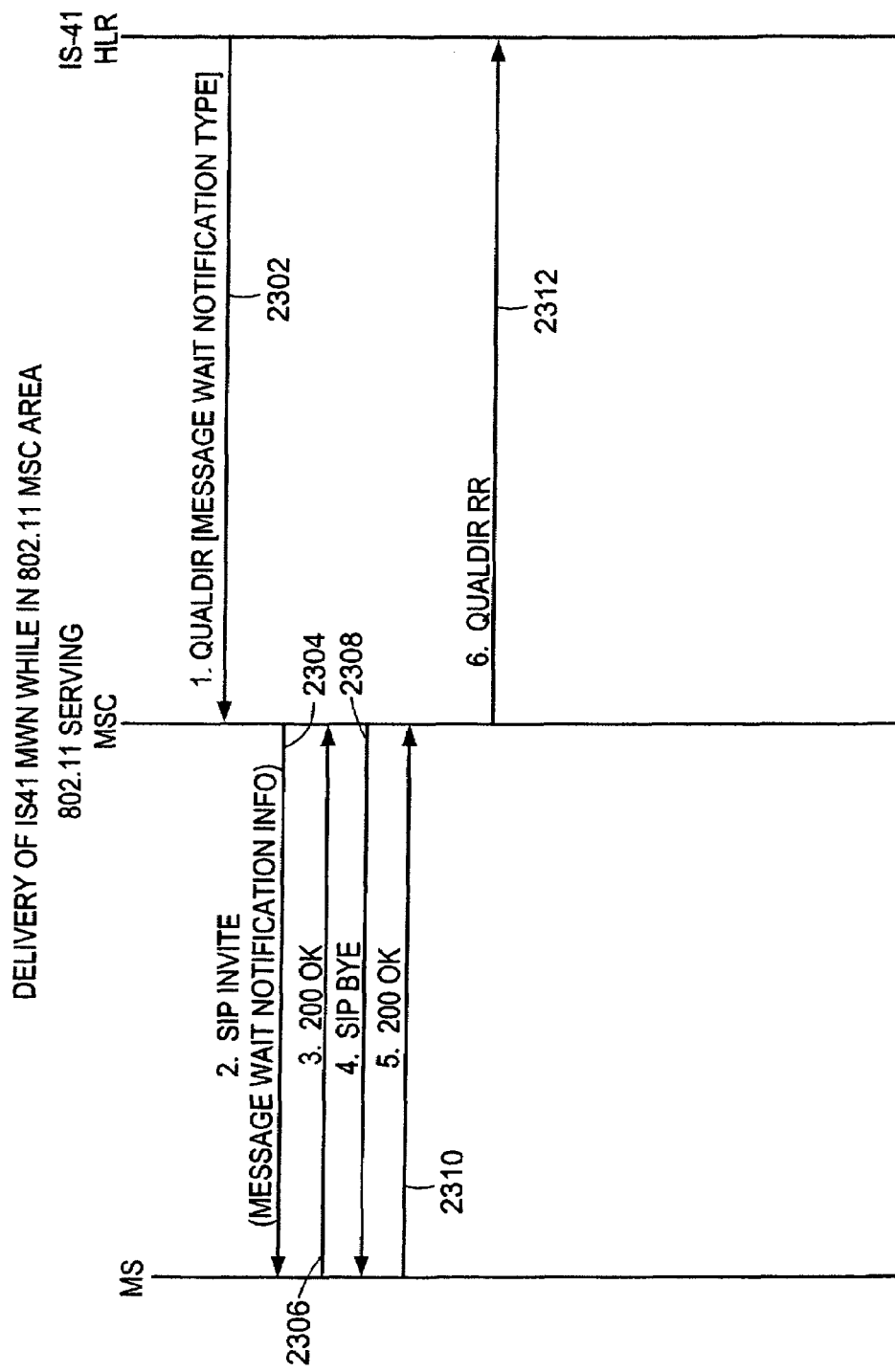
FIG. 23 shows logic for providing MWN service to a mobile station operating in a WLAN environment according to certain embodiments of the invention.

Delivery of IS-41 Message Wait Notification (MWN) in WLAN: MWN is a feature of WWAN 100. A mobile station 310 while roaming in WLAN 200 preferably supports MWN service. Under certain embodiments the logic of FIG. 23 provides MWN in WLAN.

The IS-41 HLR 114 sends 2302 a Qualification Directory Notification (with MWN Type) to the WLAN Serving MSC 302. In certain embodiments of the present invention the Serving MSC 302 overloads 2304 the SIP INVITE message with MWN info to the mobile station 310. The mobile station 310 responds 2306 with an OK acknowledgement. The Serving MSC 302 indicates 2308 to the mobile station 310 that the transaction is complete. The mobile station 310 responds 2310 OK. The Serving MSC 302 responds 2312 with Qualification Directive Notification Response Request to the IS-41 HLR.

Figure 24:
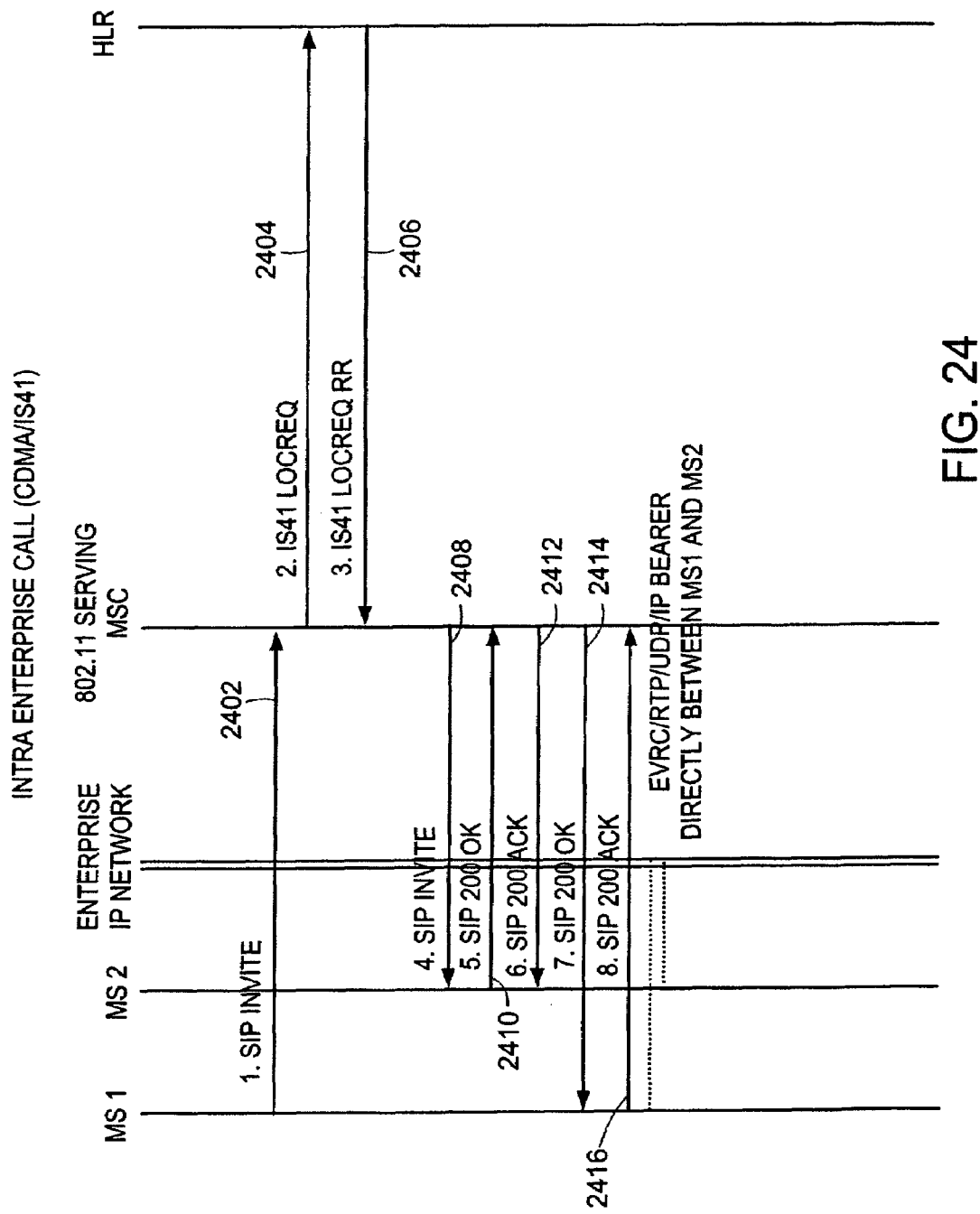

Intra Enterprise Telephone Call: In this case a mobile station 310 (MS1) while roaming in the WLAN 200 initiates an intra enterprise call to another mobile station (MS2). Under certain embodiments, all interactions with MS1 and MS2 are carried out in SIP. The logic to implement such calls is described in connection with FIG. 24.

MS1 initiates 2402 a call request to the WLAN Serving MSC 302. The MSC 302 receives the request and asks 2404 the HLR 114 to locate MS2. HLR 114 responds 2406 with location of MS2. The MSC 302 issues 2408 an invitation to MS2. MS2 acknowledges 2410 request. The MSC 302 acknowledges 2412 the acknowledgement of MS2. The MSC 302 sends 2414 acknowledgement to MS1 indicating that the call may now proceed. MS1 acks 2416, and the call between MS1 and MS2 proceeds.

Figure 25:
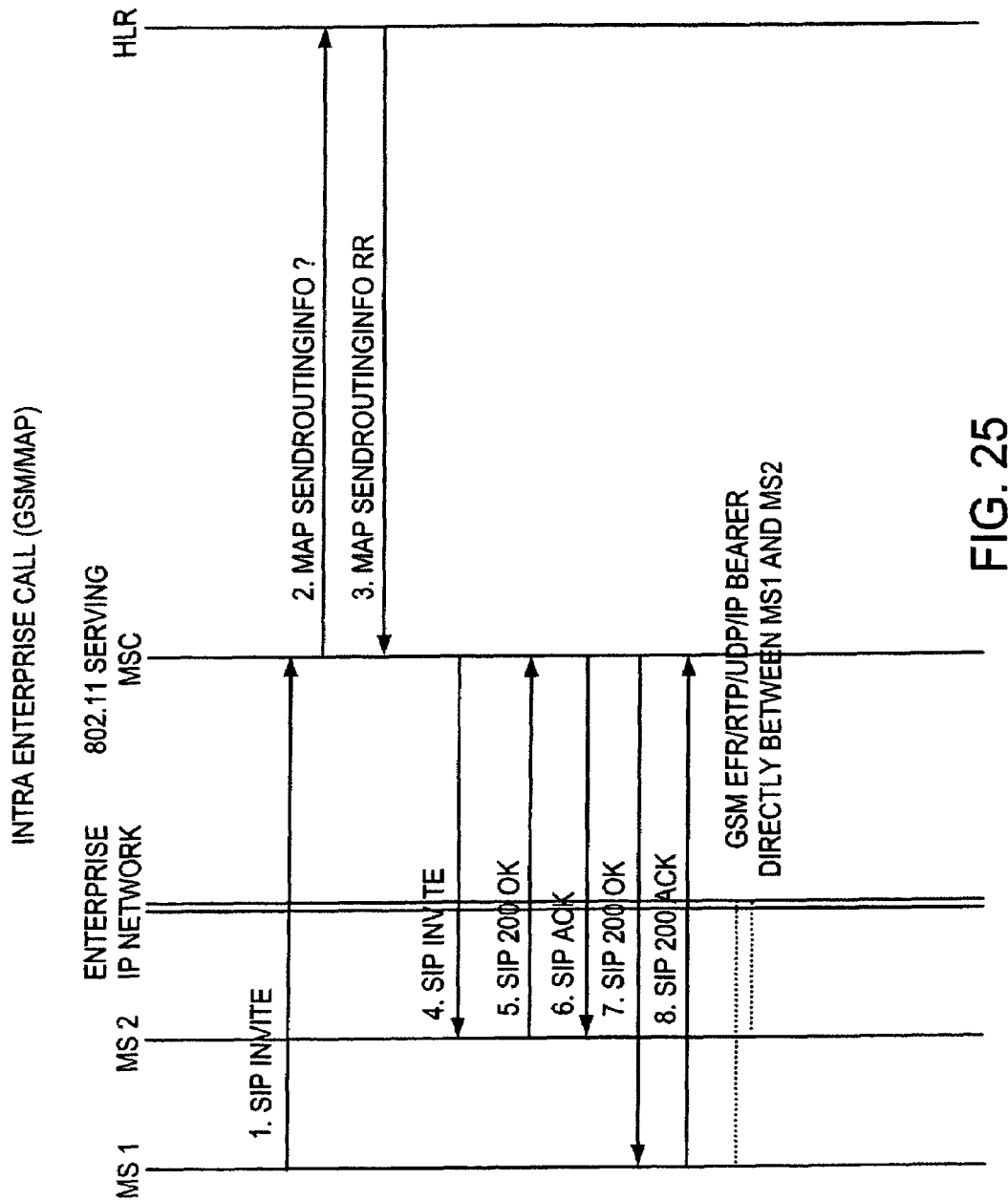

In an exemplary embodiment of the present invention, the intra enterprise call proceeds using EVRC (Extended Variable Rate Coding) on RTP/UDP/IP packets. The requests to locate MS2 in IS-41 networks may use IS-41 protocol elements. FIG. 25 shows another exemplary embodiment in which the call proceeds by using GSM EFR (Extended Full Rate Coding) on RTP/UDP/IP packets with HLR inquiries using GSM-MAP protocol elements.

Figure 26:
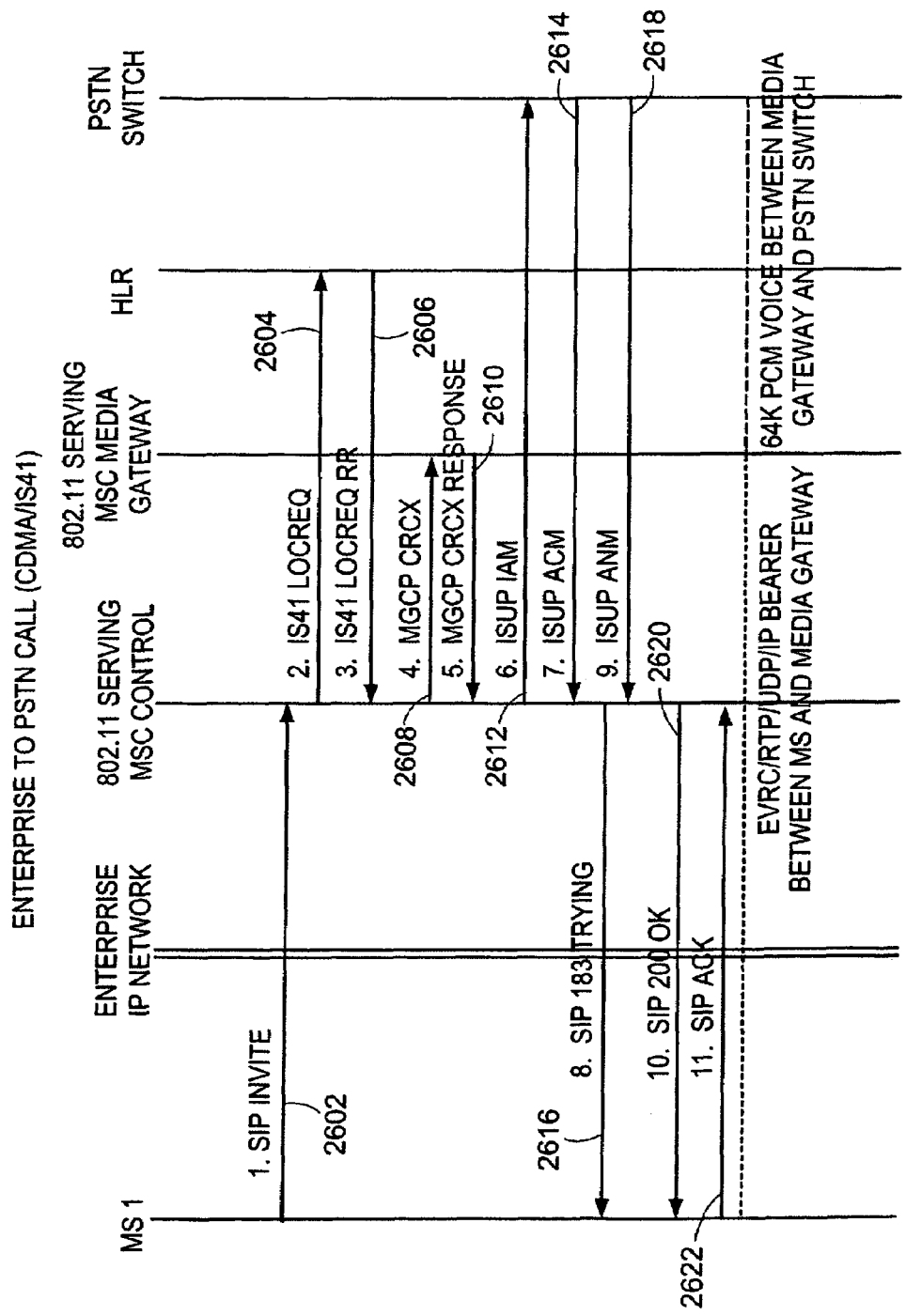

Enterprise to PSTN Telephone Call: In this case a mobile station 310 initiates a telephone call to a PSTN handset. The logic of certain embodiments of the invention to support such a call is described in connection with FIG. 26.

The mobile station 310 using SIP sends 2602 a call request to the Serving WLAN MSC 302. The Serving MSC 302 asks 2604 the HLR 114 to locate the called party. The HLR 114 responds 2606 with the location (PSTN switch) of the called party. The Serving MSC 302 requests 2608 a connection capable of carrying voice traffic from the Media Gateway of the MSC 302. The Media Gateway responds 2610 with a connection response. The Serving MSC 302 sends 2612 a connection request to the PSTN switch associated with the called telephone number (i.e., the switch to which the called party is connected). The PSTN Switch acknowledges 2614 receipt of request. The Serving MSC 302 tells 2616 the mobile station 310 that it is trying the called party. The PSTN Switch responds 2618 with connection information. The Serving MSC 302 sends 2620 a message to mobile station 310 indicating it is OK to proceed with call. The mobile station 310 acknowledges 2622 and conversation may now begin.

Figure 27:
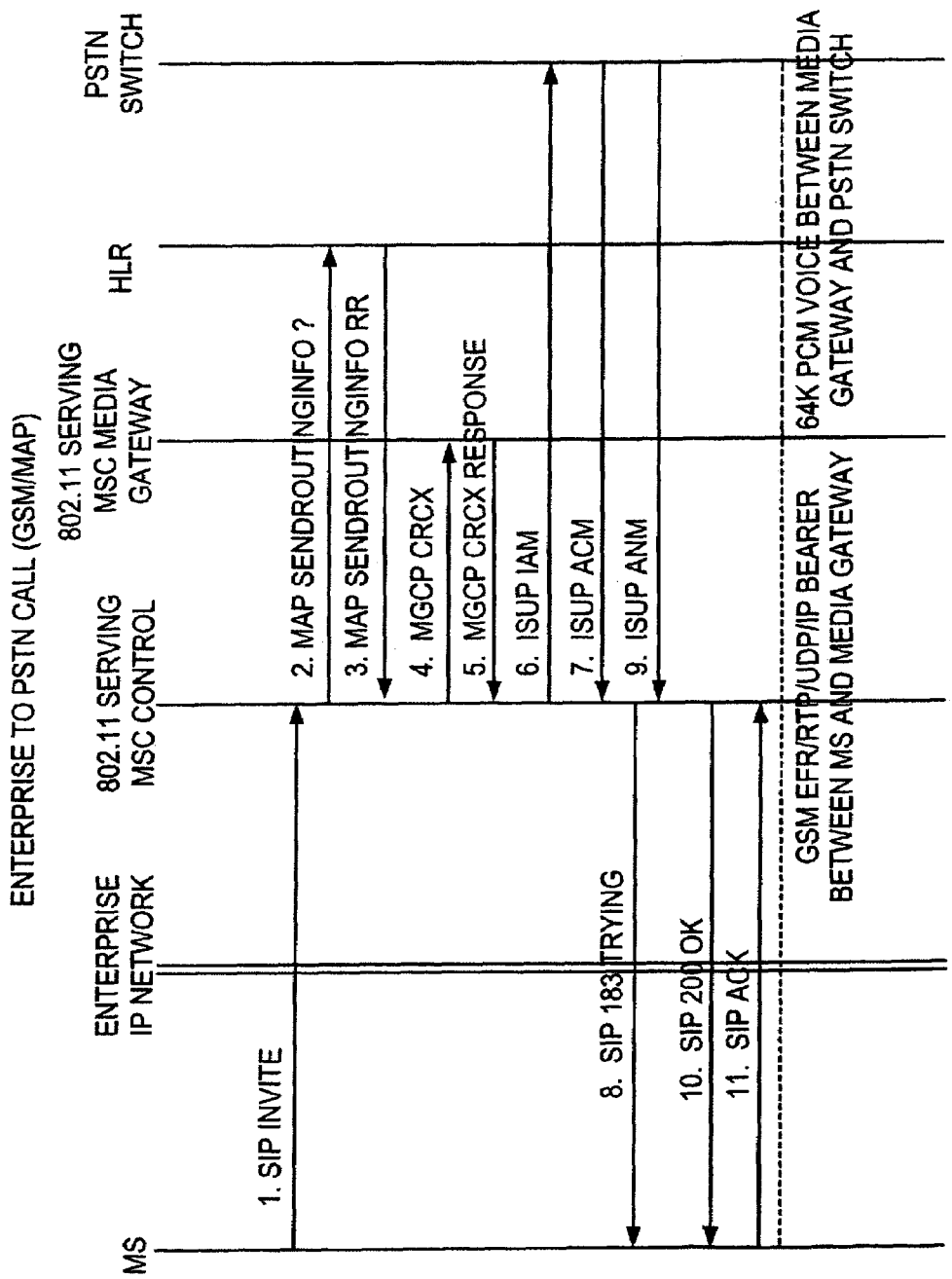

In an exemplary embodiment of the present invention the voice traffic may be carried as EVRC on RTP/UDP/IP packets between the mobile station 310 and the Serving MSC 302 and as 64K PCM voice between the Serving MSC 302 and the PSTN switch. The HLR interactions may be carried out using IS-41 protocol elements. FIG. 27 shows another exemplary embodiment in which the HLR interactions may be carried out using GSM-MAP protocol elements and the voice between the mobile station 310 and the Serving MSC 302 may be carried as GSM EFR on RTP/UDP/IP packets, and as 64K PCM voice circuits between the Serving MSC and the PSTN switch.

Figure 28:
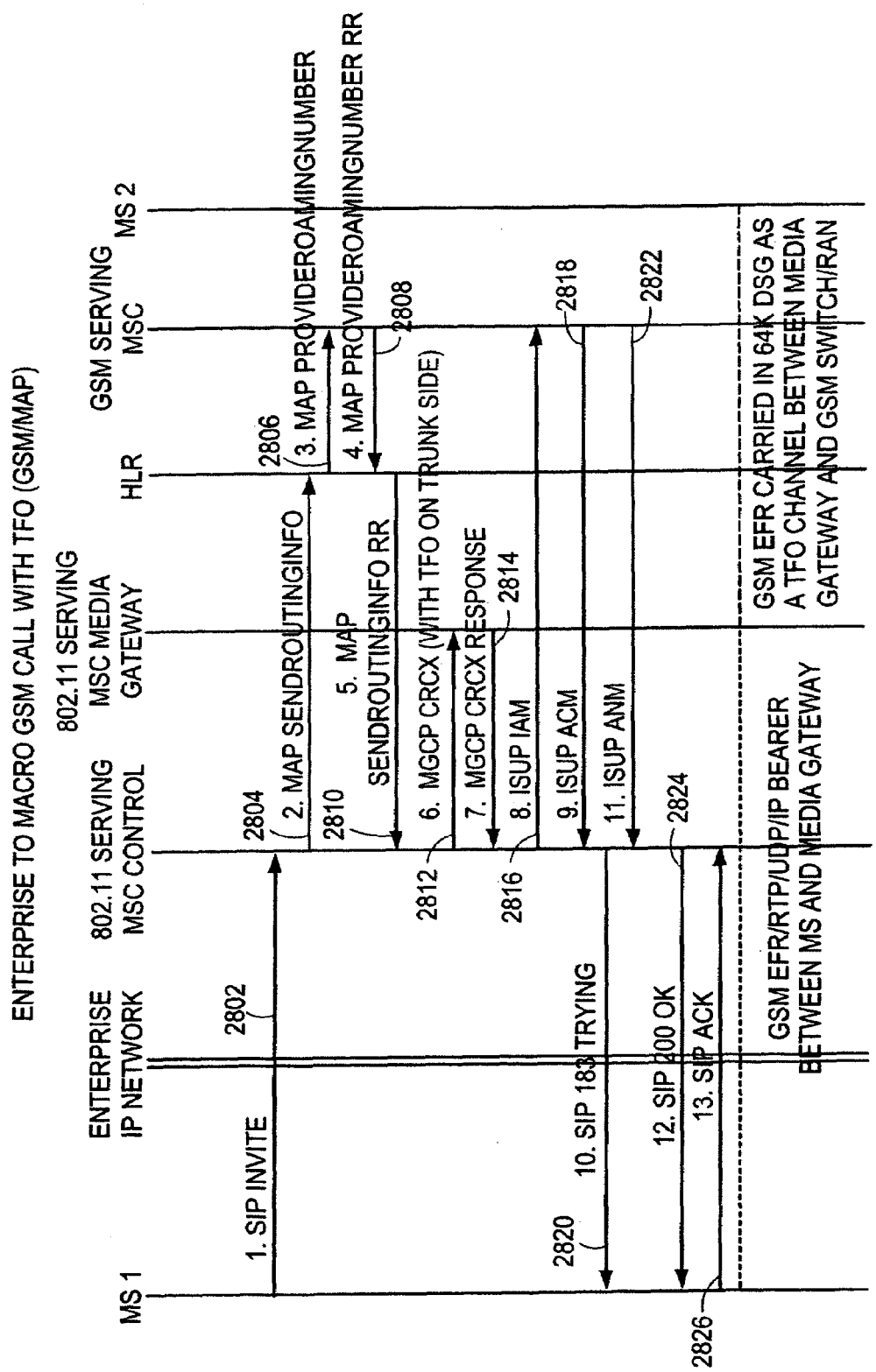
FIG. 28 shows logic for handling an enterprise to macro network call according to certain embodiments of the invention.

Enterprise to WWAN GSM telephone Call with Tandem Free Operation (TFO): In this case a mobile station 310 (MS1) initiates a telephone call to another mobile station (MS2) roaming in a GSM network. Since only mobile stations are involved in this call, it is possible to carry this call in a tandem-free operation; i.e., carry the call as GSM EFR without having to uncompress/decompress to 64K PCM. The logic of certain embodiments to implement such a call is described in connection with FIG. 28.

The mobile station 310 using SIP sends 2802 a call request to the Serving WLAN MSC 302. The Serving MSC 302 asks 2804 the HLR 114 to locate the called party using GSM MAP. The HLR 114 asks 2806 the Serving GSM MSC 110 to locate MS2, i.e., provide roaming number associated with MS2. The GSM MSC 2808 responds with MS2's roaming number to HLR 114. The HLR 114 sends 2810 routing response to WLAN Serving MSC 302. The Serving MSC 302 requests 2812 a connection capable of carrying voice traffic from the Media Gateway with TFO on trunk side. The Media Gateway responds 2814 with a connection response. The Serving MSC 302 sends 2816 a connection request to the GSM MSC. The GSM MSC 110 acknowledges 2818 receipt of request. The Serving WLAN MSC 302 tells 2820 the mobile station 310 that it is trying the called party. The GSM MSC 110 responds 2822 with connection information. The Serving MSC 302 sends 2824 a message to mobile station 310 indicating it is OK to proceed with call. The mobile station 310 acknowledges and conversation may now begin.

In this exemplary embodiment of the present invention the voice traffic may be carried as GSM EFR on RTP/UDP/IP packets between the MS and the Serving MSC and as GSM EFR in 64K DS0 as a TFO channel between the WLAN Serving MSC (Media Gateway) and the GSM MSC (or the GSM Radio Access Network).

Other Variations

Figure 29:
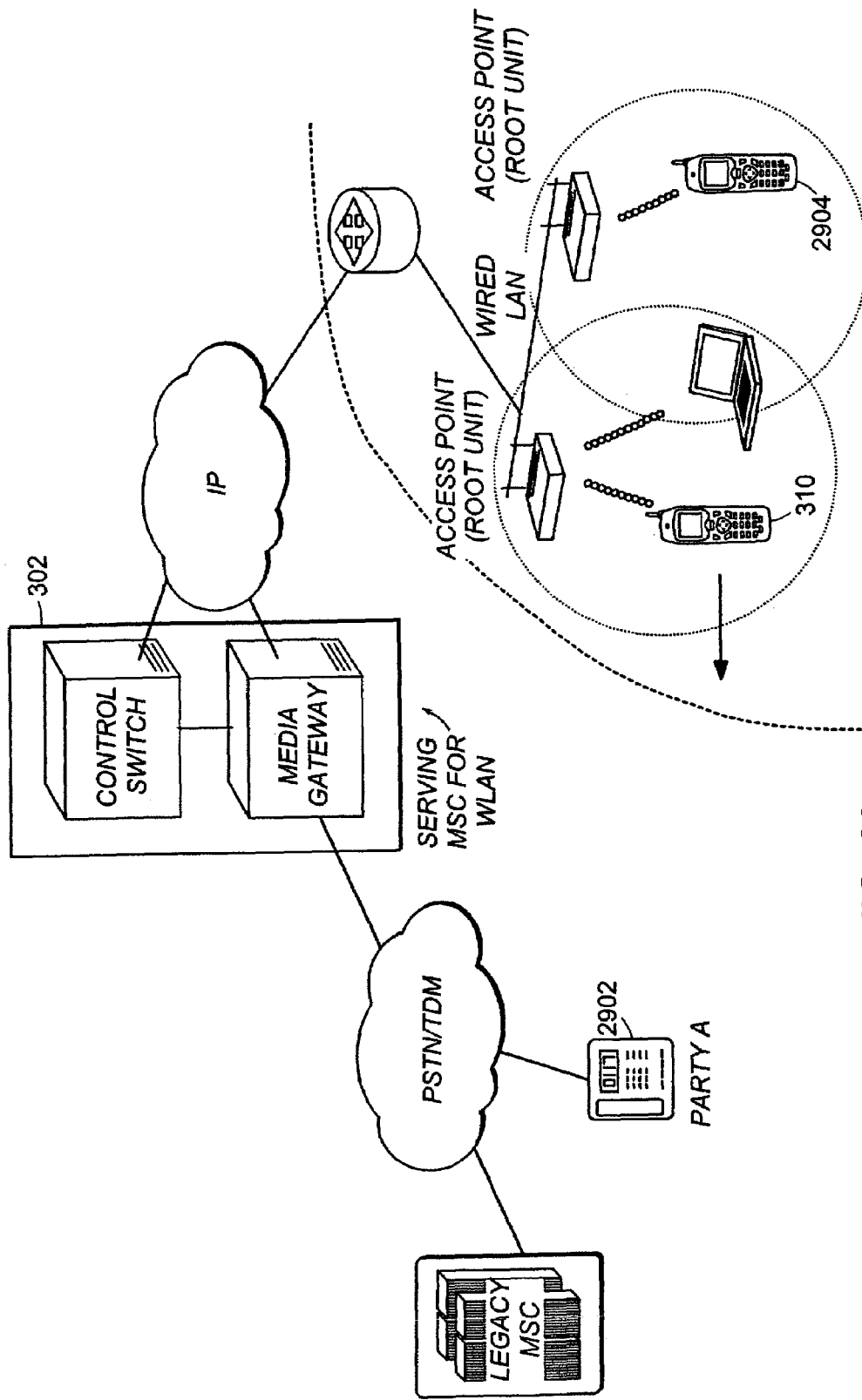
FIG. 29 shows an internetworked wireless network according to certain embodiments of the invention.
Figure 30:
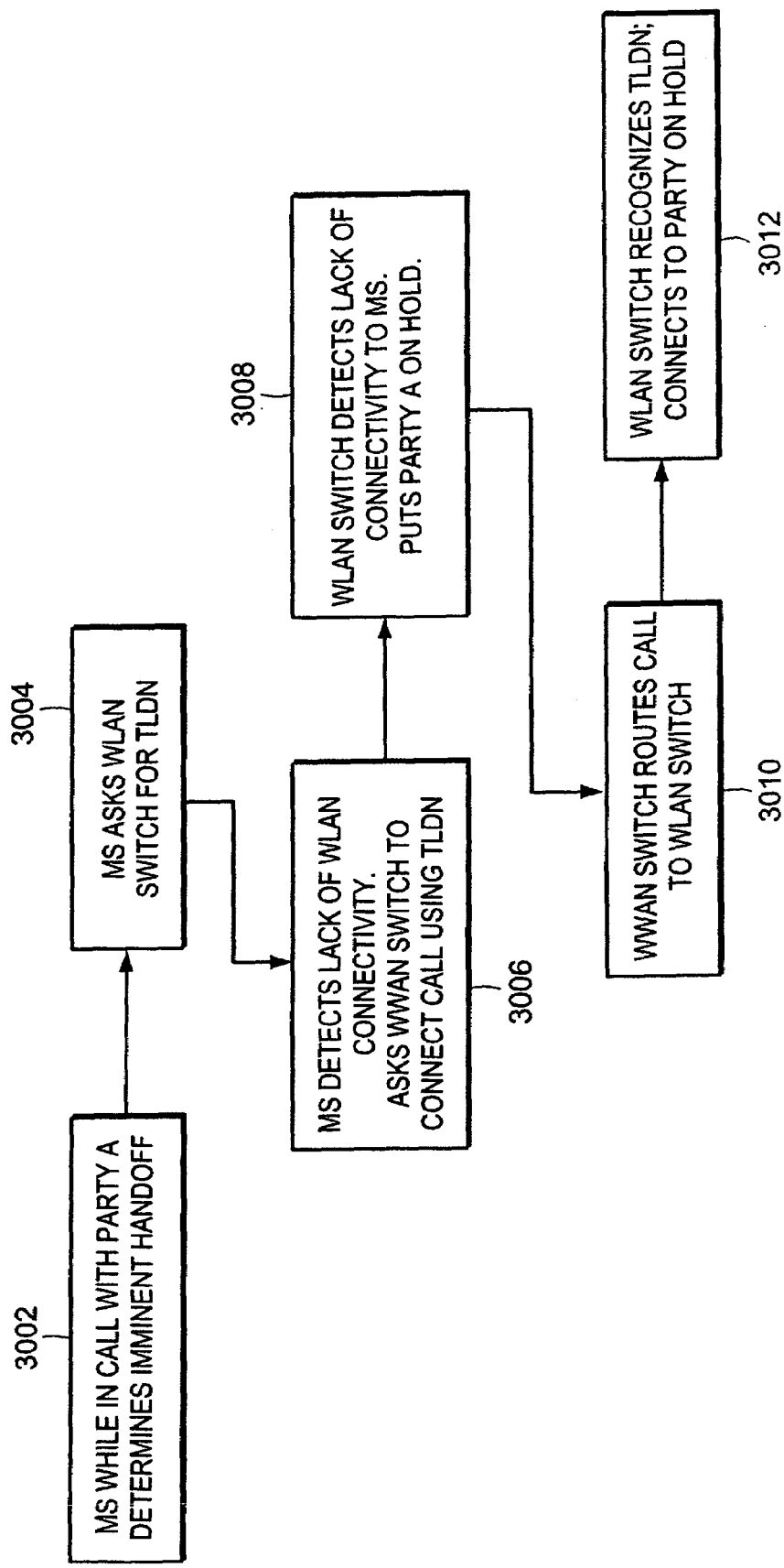
FIG. 30 shows mobility management logic according to certain embodiments of the invention.

A basic mechanism of the present invention is the handoff of the mobile station as it roams during a call from a WLAN to the WWAN environment. This mechanism assumes the existence of trunks connecting the WLAN and WWAN switches using a standard mobility management protocol such as IS-41. FIG. 29 shows an exemplary embodiment of a method that may be used to affect handoffs in the absence of such connectivity, and exemplary logic is discussed in connection with FIG. 30. As shown in the figure and in accordance to the present invention as described previously, the mobile station 310 (MS) while engaged in a telephone call with Party A, who may be using a PSTN handset 2902 or a WWAN mobile handset 2904, senses both the WLAN and WWAN environments and determines that the WLAN environment is waning in intensity whereas the WWAN environment is gaining in intensity. Under such an arrangement, mobile station 310 may determine 3002 that handoff is imminent. Upon making this determination mobile station 310 requests 3004 the WLAN switch 302 to issue it a Temporary Local Directory Number (TLDN). As is well known to practitioners in the art a TLDN may be used by other telephone exchanges to route a call to the switch issuing the TLDN. Having received the TLDN the mobile station 310 continues roaming and the mobile station 310 or the WLAN switch or both may find 3006 that the connectivity between the mobile station 310 and the WLAN switch has been lost. In such an eventuality the WLAN switch temporarily places 3008 party A on hold (WLAN may inform Party A about the on going state of affairs by playing a pre-recorded announcement). The mobile station 310 upon sensing the WWAN environment and upon successful completion of registration in the WWAN environment, requests a call to be placed using the TLDN as the destination (called party). The WWAN switch routes 3010 the call to the WLAN switch using its routing logic dependent on the TLDN. The WLAN switch recognizes 3012 the TLDN and connects Party A to the incoming call. Thus, Party A and the MS resume the on going call albeit with an interruption.

Many enterprises make use of a Private Branch Exchange (PBX). PBX systems typically provide a feature-rich environment to the attached telephones, such as abbreviated dialing, multi-party calls and the like. In certain embodiments of the present invention a WLAN switch may be used in conjunction with a PBX system.

Figure 31:
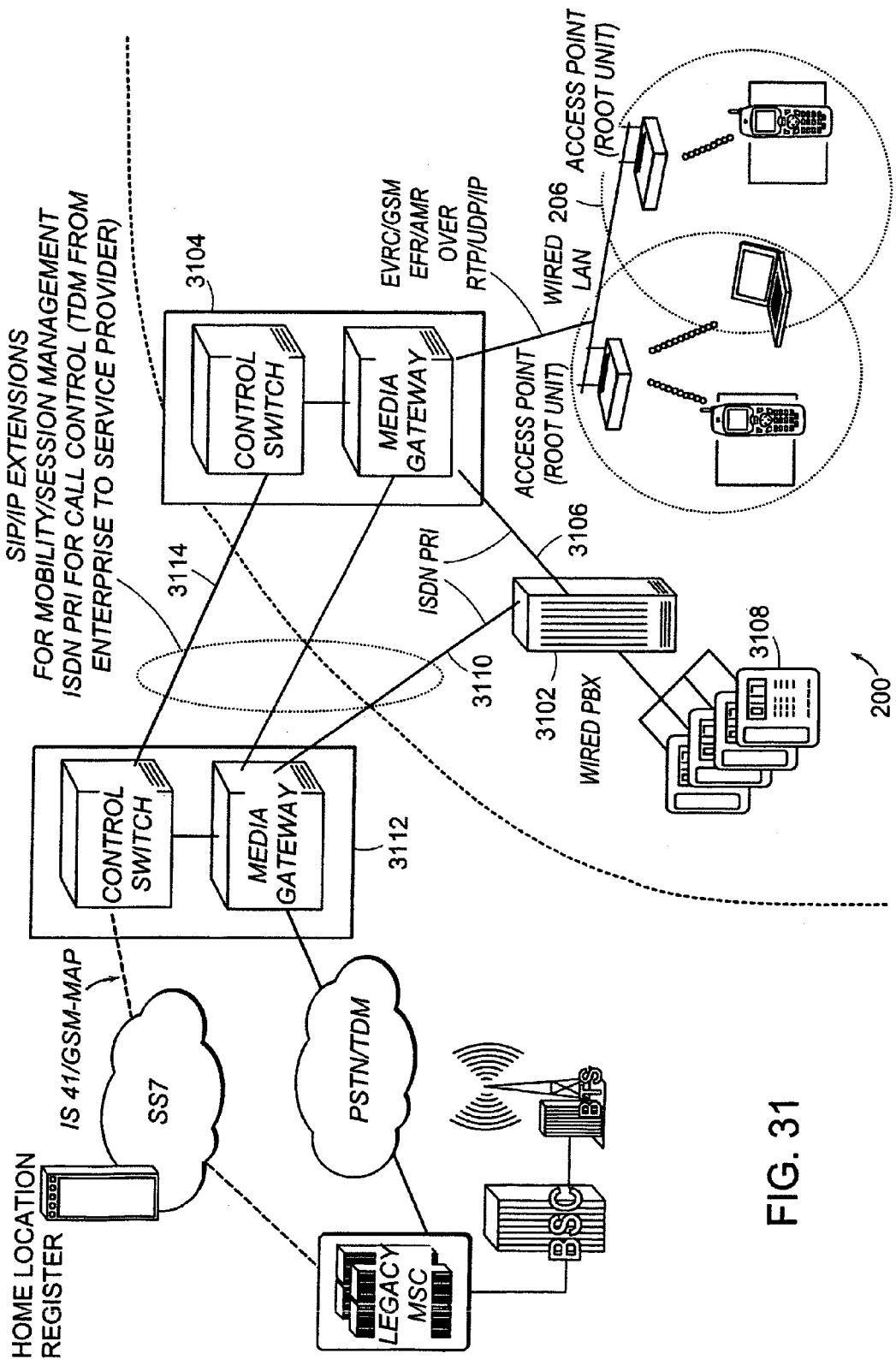
FIG. 31 shows an internetworked wireless network according to certain embodiments of the invention in which PBX services are integrated.

FIG. 31 shows an exemplary embodiment of this arrangement. The WLAN 200 is connected to the PBX 3102 via standard supported interfaces such as ISDN PRI. Telephone calls originating from a handset connected to the PBX and destined for a WLAN-controlled handset may be delivered to the WLAN switch 3104 via the standard interface. The WLAN switch may use the standard interface to deliver telephone calls to the PBX.

A mobile station 310 may make calls using the WLAN air interface, and such calls will be communicated over the wired LAN 206 to WLAN switch 2904 via the IP links of LAN 206. Switch 3104 will then communicate the call signaling (and eventually voice or other data) over ISDN PRI link 3106 to the PBX switch 3102 which will handle the call as if it were from a PBX phone 3108 and thus provide the PBX services to the mobile station. For example, if the mobile station used an abbreviated dialing scheme, the PBX would make the appropriate connections and communication would be conducted via the PBX switch 3102.

For internal calls, the WLAN switch 3104 essentially acts as a protocol converter, receiving the mobile station signaling and data as IP and providing it to the PBX via the ISDN PRI links as ISDN information.

For external calls, certain embodiments operate as follows. The WLAN switch 3104 detects that the mobile station desires to call an outside party. This may be done by analyzing the called party information, for example, to see if certain numbering plan information is used, such as prefixing the called number with the number '9'. In such case, the switch 3104 communicates with the WWAN switch 3112 and requests a TLDN to be later associated with the called party information e.g., called party number "123." When it receives such TLDN, the switch 3104 then makes a request to the PBX switch 3102 via link 3106 to connect the circuits associated with the mobile station to the WWAN switch 3112 using the TLDN i.e., requests the PBX to connect a call to the TLDN as the called party. The WWAN switch 3112 recognizes that the incoming call request with TLDN is for the previously remembered called party number 123 (i.e., WWAN switch 3104 associates the issued TLDN with previously received called party number "123" from WLAN switch 3104) and proceeds to route call to called party number "123" as dictated by standard routing logic. Thus, PBX 3102 requests call to destination TLDN but WWAN switch 3112 recognizes that the call is actually meant for destination "123" and routes the call to "123". The TLDN serves as a tag identifying the "signaling" on IP link 3114 and the request from the PBX on ISDN PRI link 3110. In this fashion, any subsequent signaling or link 3114 associated with mobile station 310 will be associated with the correct bearer circuits on link 3110.

In terms of mobility management, roaming may proceed as explained above. Hard handoffs may proceed as explained above if there exist mobility management trunks between the WWAN switch 3312 and the WLAN switch 3104. This logic is shown in FIGS. 12–14 and 19–21 with the associated descriptions of hard handoffs under various network conditions. In the absence of such trunks a handoff may proceed with regard to the use of TLDN as a handoff mechanism—namely as the mobile station roams into a WWAN area and loses radio contact with the WLAN, the mobile station will perform a handoff by automatically reconnecting with the call by using the TLDN. In this instance, the WLAN switch may inform the mobile station of the TLDN to use either during call set up, or as explained above in response to the mobile station's request (e.g., the WLAN switch 3104 may cache the TLDN and await the request of the mobile station).

In this arrangement the WWAN MSC 3112 anchors the call. Certain variations are possible. For example, during handoffs the WWAN MSC may tear down the links previously used to the PBX. This is efficient for two party calls. However to support calls in which multiple parties in the PBX domain participate, the links to the PBX must remain up. In this situation, the WWAN MSC 3112 must patch in the mobile station to the existing call.

The above discussion and the following claims at times refer to specific WLAN standards, such as 802.11. This is typically done to use a very specific example. In many instances, reference is made to 802.xx. the designation "xx" is used to indicate a wider applicability, i.e., to any of the 802 WLAN standards.

Though some of the discussion is with reference to voice calls, persons skilled in the art that the above teachings and following claims are also directed to data calls as well.

It will be further appreciated that the scope of the present invention is not limited to the above-described embodiments, but rather is defined by the appended claims, and that these claims will encompass modifications of and improvements to what has been described.

What is claimed is:

1. A method of selecting an air interface protocol for a mobile station to use, wherein the mobile station includes (a) logic to communicate according to an 802.xx wireless local area network air interface protocol (WLAN logic), (b) logic to communicate according to a wireless wide area network air interface protocol (WWAN logic), and (c) logic to select one of the WLAN logic and the WWAN logic to communicate on an air interface, the method comprising:

the mobile station detecting RF energy in a WLAN 802.xx spectrum;

in response to the energy detection step, identifying a 802.xx WLAN that can service the mobile station by performing a passive scanning operation in which the mobile station searches for a beacon frame broadcast by the 802.xx WLAN; and subsequent to identifying the 802.xx WLAN that can service the mobile station, the mobile station selecting the WLAN logic;

wherein the WWAN has information identifying the areas in which WLANs operate and wherein the WWAN provisions the mobile station with at least a subset of such information, and wherein the mobile station uses such area-identifying information to determine whether to perform the RF energy detection operation.

2. The method of claim 1 wherein the beacon frame includes a SSID identifying an access point of the 802.xx WLAN.

3. The method of claim 2 wherein the mobile station compares the SSID within the beacon frame with a set of SSIDs to determine if the SSID within the beacon frame is within the set of SSIDs and if so determining that the 802.xx WLAN sensed is valid to service the mobile station.

4. The method of claim 3 wherein the mobile station and the 802.xx WLAN authenticate the identity of each other.

5. The method of claim 1 wherein the area-identifying information is cell ids and wherein the mobile station compares the cell id information which it is operating with the provisioned cell ids.

6. The method of claim 1 wherein the area-identifying information is geographical positioning satellite (GPS) information and wherein the mobile station determines its GPS coordinates and compares it against the provisioned GPS information.

7. The method of claim 1 wherein the mobile station compares the RF energy value with a threshold value and wherein the mobile station detects the RF energy of the WWAN and compares said RF energy of the WWAN with a predetermined value and wherein the comparisons of the RF energy values with corresponding thresholds is used by the mobile station in selecting whether to communicate with the 802.xx WLAN and the WWAN.

8. The method of claim 1 wherein the area-identifying information includes information identifying WLANs other than that used by a service plan of the mobile station.

9. The method of claim 8 wherein the information identifying WLANs includes information identifying WLANs of enterprises accepting service of the mobile station.

10. The method of claim 1 wherein the mobile station is provisioned with the area information via SMS messages from the WWAN.

11. The method of claim 1 wherein the provisioning of area information in response to the multimode mobile station causing location update messages to a HLR of the WWAN.

12. A method of selecting an air interface protocol for a mobile station to use, wherein the mobile station includes (a) logic to communicate according to a wireless local area network air interface protocol (WLAN logic), (b) logic to communicate according to a wireless wide area network air interface protocol (WWAN logic), and (c) logic to select one of the WLAN logic and the WWAN logic to communicate on an air interface, the method comprising:
  the mobile station detecting RF energy in an 802.xx WLAN spectrum;
  in response to the energy detection step, identifying a 802.xx WLAN that can service the mobile station by performing an active scanning operation in which the mobile station transmits probe request frames and waits for probe responses from the 802.xx WLAN; and
  subsequent to identifying the 802.xx WLAN that can service the mobile station, the mobile station selecting the WLAN logic;
  wherein the WWAN has information identifying the areas in which WLANs operate and wherein the WWAN provisions the mobile station with at least a subset of such information, and wherein the mobile station uses such area-identifying information to determine whether to perform the RF enemy detection operation.

13. The method of claim 12 wherein the probe response includes a SSID identifying an access point of the 802.xx WLAN.

14. The method of claim 13 wherein the mobile station compares the SSID within the probe response with a set of SSIDs to determine if the SSID within the probe response is within the set of SSIDs and if so determining that the 802.xx WLAN sensed is valid to service the mobile station.

15. The method of claim 14 wherein the mobile station and the 802.xx WLAN authenticate the identity of each other.

* * * * *